(12) United States Patent
Lee et al.

(10) Patent No.: US 11,699,414 B2
(45) Date of Patent: Jul. 11, 2023

(54) FOLDABLE ELECTRONIC DEVICE FOR CONTROLLING USER INTERFACE AND METHOD OF OPERATING THE SAME

(71) Applicant: Samsung Electronics Co., Ltd., Gyeonggi-do (KR)

(72) Inventors: Sukjae Lee, Gyeonggi-do (KR); Jinkyo Chung, Gyeonggi-do (KR); Yong Kwon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/795,291

(22) Filed: Feb. 19, 2020

(65) Prior Publication Data

US 2020/0265803 A1   Aug. 20, 2020

(30) Foreign Application Priority Data

Feb. 19, 2019 (KR) ........................ 10-2019-0018901

(51) Int. Cl.
*G09G 5/14* (2006.01)
*H04B 1/3827* (2015.01)
(Continued)

(52) U.S. Cl.
CPC ............. *G09G 5/14* (2013.01); *G06F 1/1641* (2013.01); *G06F 1/1681* (2013.01); *G06F 3/041* (2013.01);
(Continued)

(58) Field of Classification Search
CPC ............. G09G 5/14; G09G 2340/0407; G09G 2354/00; G09G 2380/02; G06F 1/1641; G06F 1/1681; G06F 3/041; H04B 1/3827
See application file for complete search history.

(56) References Cited

U.S. PATENT DOCUMENTS 9,818,370 B2   11/2017   Joo
10,073,668 B2   9/2018   Chun et al.
(Continued)

FOREIGN PATENT DOCUMENTS

KR   1020130024085   3/2013
KR   1020170006055   1/2017
(Continued)

OTHER PUBLICATIONS

International Search Report dated Jun. 15, 2020 issued in counterpart application No. PCT/KR2020/002419, 8 pages.

(Continued)

*Primary Examiner* — Michael A Faragalla
*Assistant Examiner* — Sujit Shah
(74) *Attorney, Agent, or Firm* — The Farrell Law Firm, P.C.

(57) ABSTRACT

An electronic device includes a first housing including a first face, and a second face opposite the first face; a second housing including a third face, and a fourth face opposite the third face; a hinge connecting the first housing and the second house, wherein the second housing folds about the hinge to face the first housing; a flexible display extending from the first face to the third face; a sensor circuit configured to sense an angle formed by the first housing and the second housing folding at the hinge; and a processor operatively connected to the flexible display and the sensor circuit. The processor is configured to detect a physical state of the first housing and the second housing based on the sensor circuit, and re-execute a currently executed application, when the detected physical state changes.

18 Claims, 19 Drawing Sheets

(51) Int. Cl.
  *G06F 3/041*    (2006.01)
  *G06F 1/16*     (2006.01)
  *H04M 1/02*     (2006.01)

(52) U.S. Cl.
  CPC ........ *H04B 1/3827* (2013.01); *H04M 1/0268* (2013.01); *G09G 2340/0407* (2013.01); *G09G 2354/00* (2013.01); *G09G 2380/02* (2013.01)

(56) References Cited

U.S. PATENT DOCUMENTS

| | | | | |
|---|---|---|---|---|
| 2005/0079896 | A1* | 4/2005 | Kokko | H04M 1/724 |
| | | | | 455/566 |
| 2010/0182265 | A1* | 7/2010 | Kim | G06F 1/1641 |
| | | | | 345/173 |
| 2013/0321340 | A1* | 12/2013 | Seo | H04M 1/0241 |
| | | | | 345/174 |
| 2014/0258268 | A1* | 9/2014 | Woods | H04N 21/4333 |
| | | | | 707/722 |
| 2014/0370968 | A1* | 12/2014 | Curtis | A63F 13/85 |
| | | | | 463/25 |
| 2014/0375219 | A1* | 12/2014 | Lee | G09G 3/20 |
| | | | | 315/153 |
| 2014/0380186 | A1 | 12/2014 | Kim et al. | |
| 2015/0338888 | A1 | 11/2015 | Kim et al. | |
| 2016/0139634 | A1 | 5/2016 | Cho et al. | |
| 2017/0039680 | A1* | 2/2017 | Abe | G06F 3/0481 |
| 2017/0134788 | A1* | 5/2017 | Lee | G06F 9/5077 |
| 2017/0353643 | A1 | 12/2017 | Tuulos et al. | |
| 2018/0198896 | A1* | 7/2018 | Kang | H04M 1/0268 |
| 2018/0242446 | A1 | 8/2018 | Cho et al. | |
| 2018/0285049 | A1* | 10/2018 | Lim | G06F 3/1446 |
| 2018/0329514 | A1* | 11/2018 | Kwon | G06F 3/03 |
| 2020/0019305 | A1 | 1/2020 | Yang et al. | |

FOREIGN PATENT DOCUMENTS

| | | |
|---|---|---|
| KR | 20170031525 | 3/2017 |
| KR | 20170083404 | 7/2017 |
| KR | 20180027467 | 3/2018 |
| KR | 20180108182 | 10/2018 |
| WO | WO 2016/196038 | 12/2016 |

OTHER PUBLICATIONS

European Search Report dated Jan. 18, 2022 issued in counterpart application No. 20758610.8-1216, 9 pages.
Indian Examination Report dated Feb. 7, 2023 issued in counterpart application No. 202117041060, 6 pages.

* cited by examiner

FOLDABLE ELECTRONIC DEVICE FOR CONTROLLING USER INTERFACE AND METHOD OF OPERATING THE SAME

CROSS-REFERENCE TO RELATED APPLICATION(S)

This application is based on and claims priority under 35 U.S.C. § 119 to Korean Patent Application No. 10-2019-0018901, filed on Feb. 19, 2019, in the Korean Intellectual Property Office, the entire disclosure of which is incorporated herein by reference.

BACKGROUND

1. Field

The disclosure relates generally to a foldable electronic device that controls a user interface (UI) and a method of operating the same.

2. Description of Related Art

Due to the development of communication networks such as the Internet, various contents are being developed. In order to provide such various contents, electronic devices including a flexible display or a plurality of displays have been developed. Such electronic devices may be a foldable (or flexible) type in order to provide improved usability.

A foldable-type electronic device may change the mechanical state thereof when manipulated by a user. For example, a foldable-type electronic device may be folded from an expanded state to a closed state (or folded state) or vice versa.

A foldable-type electronic device may change the display on which an application execution screen is output in response to a mechanical state change. For example, when the foldable-type electronic device is unfolded to an expanded state, the electronic device may output an execution screen through a main display exposed in the expanded state. As another example, when the foldable-type electronic device is folded to the closed state, the electronic device may output an execution screen through a sub-display exposed in the closed state.

In addition, the electronic device may adjust the horizontal and vertical directions of the execution screen such that the execution screen is output without a blank space in the changed display. However, in the execution screen in which the horizontal and vertical directions are adjusted to match the changed display, a problem may occur in that the screen configuration is misaligned or at least a part of the screen (e.g., an image) is abnormally output.

SUMMARY

The disclosure is made to address at least the problems and/or disadvantages described above and to provide at least the advantages described below.

Accordingly, an aspect of the disclosure is to provide a method and an apparatus that normally output an execution screen in response to a mechanical state change of an electronic device.

Another aspect of the disclosure is to provide a method and an apparatus that restart a currently executed application in response to a mechanical state change in a flexible-type electronic device.

Another aspect of the disclosure is to provide a method and an apparatus that induce a normal execution screen to be output by providing a restart guide of a currently executed application in response to a mechanical state change in a flexible-type electronic device.

In accordance with an aspect of the disclosure, an electronic device includes a first housing including a first face, and a second face opposite the first face; a second housing including a third face, and a fourth face opposite the third face; a hinge connecting the first housing and the second house, wherein the second housing folds about the hinge to face the first housing; a flexible display extending from the first face to the third face; a sensor circuit configured to sense an angle formed by the first housing and the second housing folding at the hinge; and a processor operatively connected to the flexible display and the sensor circuit. The processor is configured to detect a physical state of the first housing and the second housing based on the sensor circuit, and re-execute a currently executed application, when the detected physical state changes. The physical state includes a first state in which the first housing and the second housing are folded onto each other or a second state in which the first face of the first housing and the third face of the second housing face a same direction.

In accordance with another aspect of the disclosure, a method of operating an electronic device includes detecting a physical state of a first housing and a second housing of the electronic device, based on a sensor circuit; and re-executing a currently executed application, when the physical state is changed. The physical state includes a first state in which the first housing and the second housing are folded onto each other or a second state in which a first face of the first housing and a third face of the second housing face a same direction.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
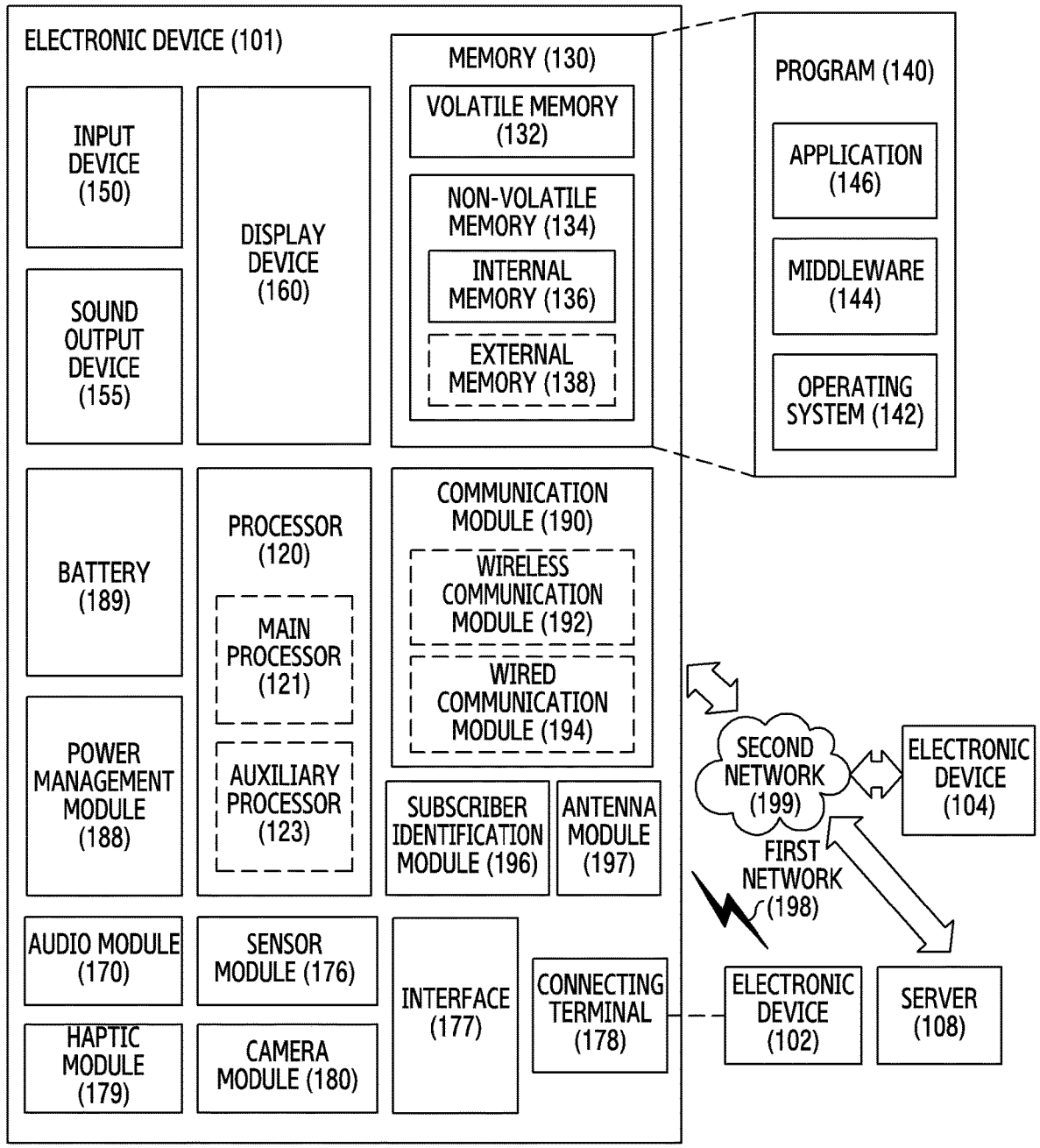
FIG. 1 illustrates an electronic device according to an embodiment.

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure.

In addition, descriptions of well-known functions and constructions are omitted for clarity and conciseness.

In describing the drawings, similar reference numerals are used to designate similar elements. Additionally, singular forms may include plural forms as well unless the context clearly indicates otherwise.

FIG. 1 illustrates an electronic device in a network environment according to an embodiment.

Referring to FIG. 1, an electronic device 101 in the network environment may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. Alternatively, at least one of the components (e.g., the display device 160 or the camera module 180) may be omitted from the electronic device 101, or one or more other components may be added in the electronic device 101. Additionally, some of the components may be implemented as single integrated circuitry. For example, the sensor module 176 may be embedded in the display device 160.

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software and input data or output data for a command related thereto. The memory 130 includes the volatile memory 132 and the non-volatile memory 134.

The program 140 may be stored in the memory 130 as software, and includes, for example, an operating system (OS) 142, middleware 144, and an application 146.

The input device 150 may receive a command or data to be used by other component (e.g., the processor 120) of the electronic device 101, from the outside (e.g., a user) of the electronic device 101. The input device 150 may include a microphone, a mouse, a keyboard, or a digital pen (e.g., a stylus pen).

The sound output device 155 may output sound signals. The sound output device 155 may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to a user of the electronic device 101. The display device 160 may include a display, a hologram device, and/or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of the electronic device 102 directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, and/or an audio interface.

A connecting terminal 178 may include a connector via which the electronic device 101 may be physically connected with the external electronic device (e.g., the electronic device 102). The connecting terminal 178 may include an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell that is not rechargeable, a secondary cell that is rechargeable, and/or a fuel cell.

The communication module 190 may support establishing a direct (e.g., wired) communication channel or a wireless communication channel between the electronic device 101 and the electronic device 102, the electronic device 104, and/or the server 108 and performing communication via the established communication channel. The communication module 190 may include one or more CPs that are operable independently from the processor 120 (e.g., the AP) and supports a direct (e.g., wired) communication or a wireless communication. The communication module 190 includes a wireless communication module 192 (e.g., a cellular communication module, a short-range wireless communication module, or a global navigation satellite system (GNSS) communication module) and a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., PCB). The antenna module 197 may include a plurality of antennas. At least one antenna appropriate for a communication scheme used in the communication network, such as the first network 198 or the second network 199, may be selected, e.g., by the communication module 190 (e.g., the wireless communication module 192), from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The processor 120 may sense a resolution change event of an electronic device 101 (e.g., an output resolution change event) using at least one sensor (e.g., the sensor module 176). The resolution change event may include a physical state and/or a physical state change of the electronic device 101. The physical state of the electronic device 101 may include the state in which the electronic device 101 is physically closed and the state in which the electronic device 101 is physically unfolded. For example, the state in which the electronic device 101 is physically unfolded may include the state in which a first face (e.g., the front face) (or a second face (e.g., the rear face)) of a first housing structure of the electronic device 101 and a first face (e.g., the front face) (or a second face (e.g., the rear face)) of a second housing structure face substantially the same direction (a substantially flat state). For example, the state in which the electronic device 101 is physically closed may include the state in which the first face (or the second face) of the first housing structure of the electronic device 101 and the first face (or the second face) of the second housing structure are disposed to face each other.

The processor 120 may sense a resolution change event while an application is executed. The processor 120 may sense a physical state and/or a physical state change of the electronic device 101 based on data received from the sensor module 176. For example, the processor 120 may determine (or calculate) an angle between the first face of the first housing structure and the first face of the second housing structure of the electronic device 101 based on at least one of an angle sensor, a strain sensor, a distance sensor, or a gyroscope sensor included in the electronic device 101. In addition, the processor 120 may determine which one of a first predetermined angle range (e.g., a range greater than about 90 degrees and less than or equal to about 180 degrees) and a second predetermined angle range (e.g., a range greater than or equal to about 0 degrees and less than about 20 degrees) the angle between the first face of the first housing structure and the first face of the second housing structure corresponds to. For example, when the angle between the first face of the first housing structure and the first face of the second housing structure corresponds to the first predetermined angle range, the processor 120 may determine that the electronic device 101 is in the expanded state. In addition, when the angle between the first face of the first housing structure and the first face of the second housing structure corresponds to the second predetermined angle range, the processor 120 may determine that the electronic device 101 is in the closed state. However, this is merely an example, and this disclosure is not limited thereto. For example, even when it is determined that the angle between the first face of the first housing structure and the first face of the second housing structure corresponds to a third predetermined angle range (e.g., a range greater than or equal to about 20 degrees and less than or equal to about 90 degrees), the processor 120 may determine that the electronic device 101 is in the expanded state.

When sensing a resolution change event, the processor 120 may perform control such that the resolution of the application execution screen is changed in response to the event. The processor 120 may control a display (e.g., a display device) such that the application execution screen is output at a predetermined resolution. For example, the processor 120 may perform control such that the application execution screen is output through a main display while the electronic device 101 is in a physically expanded state (or the state in which the electronic device 101 is changed from the physically closed state to the expanded state).

The main display may be disposed on the first face (e.g., the front face) of the electronic device 101. In this case, the processor 120 may perform control such that the resolution of the application execution screen is changed based on the size of the main display.

As another example, the processor 120 may perform control such that the application execution screen is output through a sub-display while the electronic device 101 is in a physically closed state (or the state in which the electronic device 101 is changed from the physically expanded state to the physically closed state).

The sub-display may be disposed on the second face (e.g., the rear face) opposite the first face of the electronic device 101. In this case, the processor 120 may perform control such that the resolution of the application execution screen is changed based on the size of the sub-display.

The predetermined resolution may include a first predetermined resolution at which the horizontal and vertical directions of the execution screen are adjusted such that the execution screen is output without a blank space in the display based on the size of the main display or the sub-display. The predetermined resolution may include a second predetermined resolution at which the horizontal and vertical directions of the execution screen are adjusted based on the aspect ratio of the main display or the sub-display. The processor 120 may perform control such that the resolution of the application execution screen is changed based on the type of the application under execution. The application type may include a first application type defined to change the application execution screen to a first predetermined resolution when sensing a resolution change event and a second application type defined to change the application execution screen to a second predetermined resolution when sensing a resolution change event. The application type may be recorded in the metadata of the application, and the processor 120 may determine the application type based on the metadata of the application under execution. The application type may be determined based on the genre of the application. For example, the processor 120 may determine the application type based on whether the genre of the application under execution corresponds to a predetermined genre (e.g., game or finance). The application type may be determined based on a function supported by the application under execution (e.g., an automatic screen rotation function). For example, the processor 120 may determine the application type based on whether the application under execution supports a predetermined function.

The processor 120 may perform control such that an expanding guide (unfolding guide) is provided while an application execution screen is being output at a predetermined resolution through the sub-display. The unfolding guide may include information for notifying that the application under execution is an application optimized for the main display. For example, when an application optimized for the main display is executed, the processor 120 may perform control such that the unfolding guide is provided. However, this is merely an example, and this disclosure is not limited thereto. For example, the processor 120 may perform control such that a closing guide (folding guide) is provided while an application execution screen is being output at a predetermined resolution through the main display. The folding guide may include information for notifying that the application under execution is an application optimized for the sub-display. For example, when an application optimized for the sub-display is executed, the processor 120 may perform control such that the folding guide is provided.

While the application execution screen is output at the predetermined resolution or the unfolding guide (or the folding guide) is output, the processor 120 may perform control such that an application restart guide is provided. The application restart guide may be information for notifying that an application under execution may be abnormally operated by a resolution change. In addition, the application restart guide may be information for inducing the restart (or re-execution) of the application in order to prevent the application under execution from operating abnormally. For example, the processor 120 may perform control such that the application restart guide is provided to at least one of at least a portion of an application execution screen that is changed and outputted at a predetermined resolution and a portion (e.g., a navigation bar) in which a menu bar for the electronic device (or an execution screen).

The processor 120 may perform control such that the application under execution is restarted (or executed) while the application restart guide is output. For example, when the physical state of the electronic device 101 is the expanded state, the processor 120 may perform control such that the application is restarted such that the execution screen is output at a resolution corresponding to the size of the main display. As another example, when the physical state of the electronic device 101 is the closed state, the processor 120 may perform control such that the application is restarted such that the execution screen is output at a resolution corresponding to the size of the sub-display.

The processor 120 may perform control such that the application is restarted in response to sensing an input for instructing application restart. For example, the input for instructing application restart may be at least one of touch input, voice input, key input, and gesture input. However, this is merely an example, and this disclosure is not limited thereto. For example, the input for instructing application restart may be a combination of two or more of the listed inputs.

Figure 2:
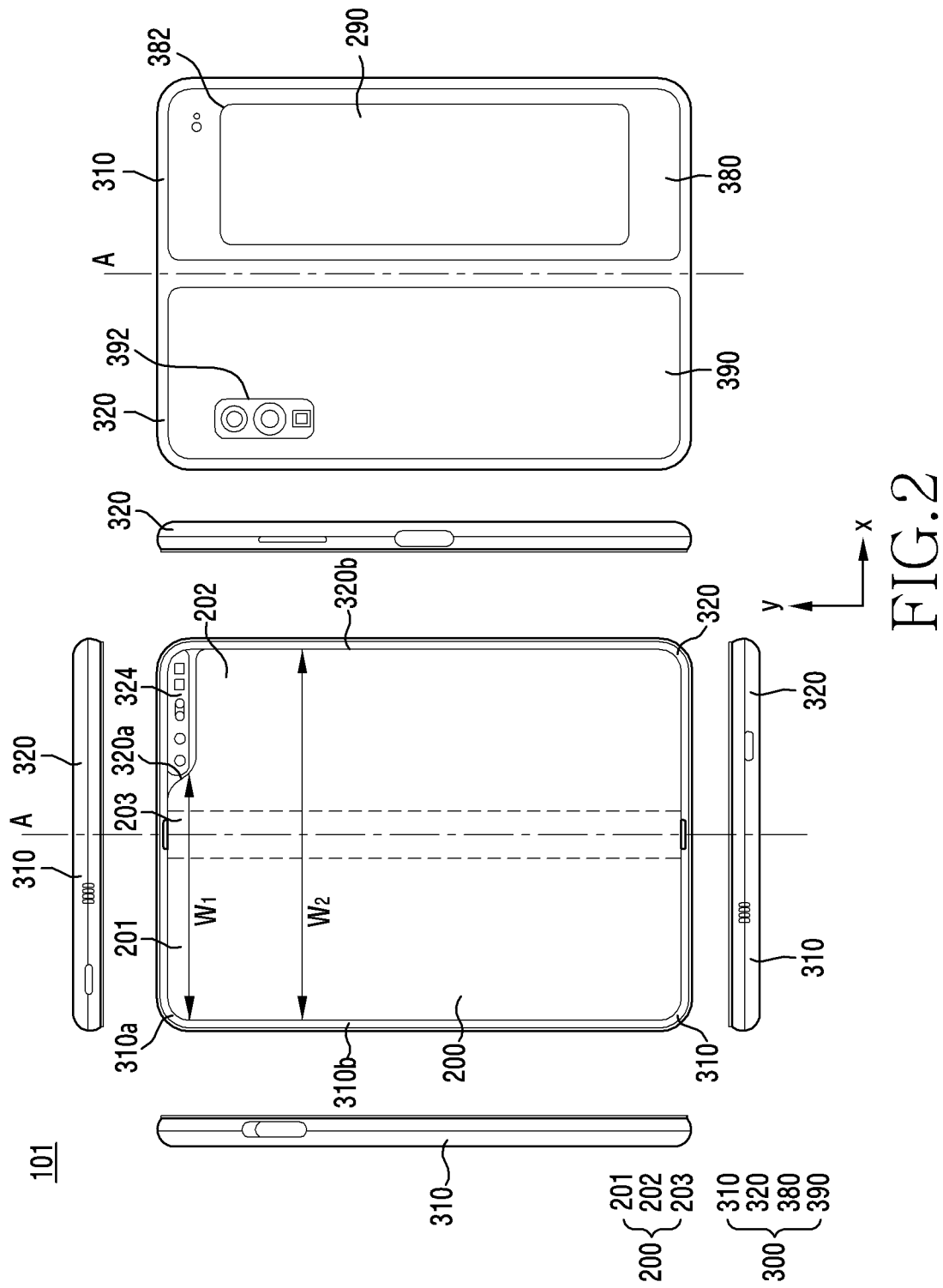
FIG. 2 illustrates an electronic device in a flat state according to an embodiment.
Figure 3:
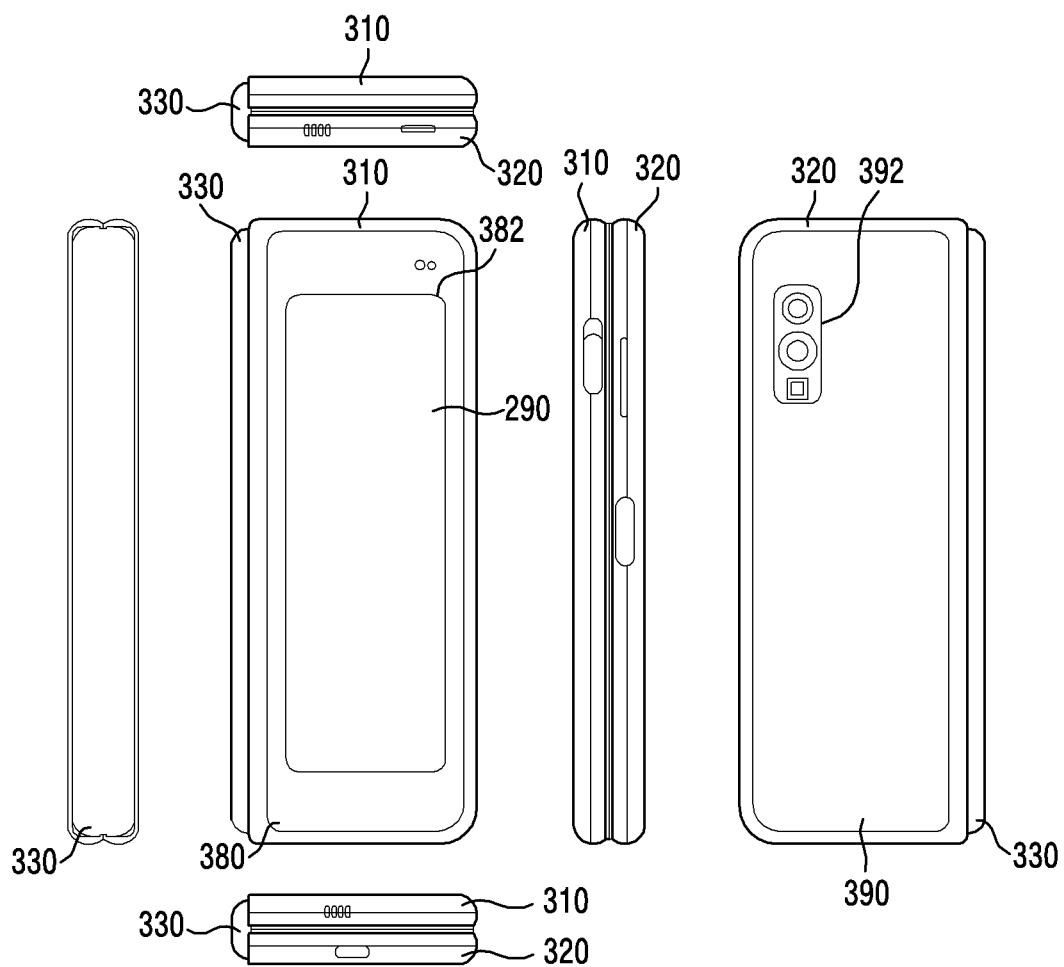
FIG. 3 illustrates an electronic device in a folded state according to an embodiment.

FIG. 2 illustrates a flat state of an electronic device according to an embodiment. FIG. 3 illustrates a folded state of the electronic device according to an embodiment. More specifically, the electronic device 101 may have the flat state or the unfolded state illustrated in FIG. 2, the folded state illustrated in FIG. 3, and an intermediate state between the flat state and the folded state. As used herein, the term "folded state" refers to a "fully folded state" unless specifically stated otherwise, and an illustration of the intermediate state in which the electronic device 101 is folded with a certain angle will be separately described.

Referring to FIGS. 2 and 3, the electronic device 101 includes a foldable housing 300, a hinge cover 330 that covers a foldable portion of the foldable housing 300, and a flexible or foldable display 200 (hereinafter, referred to as the "display 200") that is disposed in a space formed by the foldable housing 300.

Herein, a surface on which the display 200 is disposed is defined as a first surface or a front surface of the electronic device 101, and a surface opposite to the front surface is defined as a second surface or a rear surface of the electronic device 101. A surface that surrounds a space between the front surface and the rear surface is defined as a third surface or a side surface of the electronic device 101.

The foldable housing 300 includes a first housing structure 310, a second housing structure 320 including a sensor area 324, a first back cover 380, and a second back cover 390. The foldable housing 300 of the electronic device 101 is not limited to the form and the coupling illustrated in FIGS. 2 and 3 and may be implemented by a combination and/or a coupling of other shapes or parts. For example, the first housing structure 310 and the first back cover 380 may be integrally formed with each other, and the second housing structure 320 and the second back cover 390 may be integrally formed with each other.

The first housing structure 310 and the second housing structure 320 may be disposed on opposite sides of a folding axis (an axis A) and may have substantially symmetrical shapes with respect to the folding axis A. As will be described below, the angle or distance between the first housing structure 310 and the second housing structure 320 may vary depending on whether the electronic device 101 is in a flat, folded, or intermediate state.

Unlike the first housing structure 310, the second housing structure 320 may additionally include the sensor area 324 in which various sensors are arranged, but may have a symmetrical shape in the other area.

As illustrated in FIG. 2, the first housing structure 310 and the second housing structure 320 may form a recess together in which the display 200 is received. Due to the sensor area 324, the recess may have two or more different widths in a direction perpendicular to the folding axis A.

For example, the recess may have (1) a first width w1 between a first portion 310a of the first housing structure 310 that is parallel to the folding axis A and a first portion 320a of the second housing structure 320 that is formed on the periphery of the sensor area 324 and (2) a second width w2 formed by a second portion 310b of the first housing structure 310 and a second portion 320b of the second housing structure 320 that does not correspond to the sensor area 324 and that is parallel to the folding axis A. The second width w2 may be formed to be longer than the first width w1. The first portion 310a of the first housing structure 310 and the first portion 320a of the second housing structure 320, which have asymmetrical shapes, may form the first width w1 of the recess, and the second portion 310b of the first housing structure 310 and the second portion 320b of the second housing structure 320, which have symmetrical shapes, may form the second width w2 of the recess. The first portion 320a and the second portion 320b of the second housing structure 320 may have different distances from the folding axis A. The widths of the recess are not limited to the illustrated examples. Alternatively, the recess may have a plurality of widths by the form of the sensor area 324 or by the portions of the first housing structure 310 and the second housing structure 320 that have asymmetrical shapes.

At least a part of the first housing structure 310 and the second housing structure 320 may be formed of metal or non-metal having strength selected to support the display 200.

The sensor area 324 may be formed to have a predetermined area adjacent to one corner of the second housing structure 320. However, the arrangement, shape, and size of the sensor area 324 are not limited to the illustrated example. For example, the sensor area 324 may be provided in another corner of the second housing structure 320 or in any area between an upper corner and a lower corner of the second housing structure 320. Parts embedded in the electronic device 101 to perform various functions may be exposed on the front surface of the electronic device 101 though the sensor area 324 or through one or more openings formed in the sensor area 324. The parts may include various types of sensors, e.g., at least one of a front camera, a receiver, or a proximity sensor.

The first back cover 380 may be disposed on one side of the folding axis A on the rear surface of the electronic device 101 and may have a substantially rectangular periphery that is surrounded by the first housing structure 310. Similarly, the second back cover 390 may be disposed on an opposite side of the folding axis A on the rear surface of the electronic device 101 and may have a periphery surrounded by the second housing structure 320.

The first back cover 380 and the second back cover 390 may have substantially symmetrical shapes with respect to the folding axis (the axis A). However, the first back cover 380 and the second back cover 390 do not necessarily have symmetrical shapes. That is, the electronic device 101 may include the first back cover 380 and the second back cover 390 in various shapes.

Alternatively, the first back cover 380 may be integrally formed with the first housing structure 310, and the second back cover 390 may be integrally formed with the second housing structure 320.

The first back cover 380, the second back cover 390, the first housing structure 310, and the second housing structure 320 may form a space in which various parts (e.g., a printed circuit board or a battery) of the electronic device 101 are disposed. One or more parts may be disposed or visually exposed on the rear surface of the electronic device 101. For example, at least part of a sub-display 290 may be visually exposed through a first rear area 382 of the first back cover 380. One or more parts or sensors may be visually exposed through a second rear area 392 of the second back cover 390. The sensors may include a proximity sensor and/or a rear camera.

Referring to FIG. 3, the hinge cover 330 may be disposed between the first housing structure 310 and the second housing structure 320 to hide internal parts (e.g., hinge structures). The hinge cover 330 may be hidden by part of the first housing structure 310 and part of the second housing structure 320, or may be exposed to the outside, depending on a state (e.g., a flat state or a folded state) of the electronic device 101.

For example, when the electronic device 101 is in a flat state as illustrated in FIG. 2, the hinge cover 330 may be hidden by the first housing structure 310 and the second housing structure 320, and thus, may not be exposed. As another example, when the electronic device 101 is in a folded state (e.g., a fully folded state) as illustrated in FIG. 3, the hinge cover 330 may be exposed between the first housing structure 310 and the second housing structure 320 to the outside. As another example, when the electronic device 101 is in an intermediate state in which the first housing structure 310 and the second housing structure 320 are folded with a certain angle, the hinge cover 330 may be partially exposed between the first housing structure 310 and the second housing structure 320 to the outside. However, in this case, the exposed area may be smaller than that when the electronic device 101 is in a fully folded state. The hinge cover 330 may include a curved surface.

The display 200 may be disposed in the space formed by the foldable housing 300. For example, the display 200 may be mounted in the recess formed by the foldable housing 300 and may form almost the entire front surface of the electronic device 101.

Accordingly, the front surface of the electronic device 101 may include the display 200, and a partial area of the first housing structure 310 and a partial area of the second housing structure 320 that are adjacent to the display 200. The rear surface of the electronic device 101 may include the first back cover 380, a partial area of the first housing structure 310 that is adjacent to the first back cover 380, the second back cover 390, and a partial area of the second housing structure 320 that is adjacent to the second back cover 390.

The display 200 may refer to a display, at least a partial area of which is able to be transformed into a flat surface or a curved surface. The display 200 may include a folding area 203, a first area 101 disposed on one side of the folding area 203 (on a left side of the folding area 203 illustrated in FIG. 2), and a second area 202 disposed on an opposite side of the folding area 203 (on a right side of the folding area 203 illustrated in FIG. 2).

The areas of the display 200 illustrated in FIG. 2 are just one example, and the display 200 may be divided into a plurality of (e.g., four or more, or two) areas according to a structure or function of the display 200. For example, the areas of the display 200 may be divided from each other by the folding area 203 or the folding axis (the axis A) that extends in parallel to the y-axis. Alternatively, the display 200 may be divided into areas with respect to another folding area (e.g., a folding area parallel to the x-axis) or another folding axis (e.g., a folding axis parallel to the x-axis).

The first area 101 and the second area 202 may have substantially symmetrical shapes with respect to the folding area 203. However, unlike the first area 101, the second area 202 may include a notch 104 that is cut according to the presence of the sensor area 324, but in the other area, the second area 202 may be symmetric to the first area 101. In other words, the first area 101 and the second area 202 may each include a portion having a symmetrical shape and a portion having an asymmetrical shape.

When the electronic device 101 is in a flat state, as illustrated in FIG. 2, the first housing structure 310 and the second housing structure 320 may be arranged to face the same direction while forming an angle of 180 degrees. The surface of the first area 101 of the display 200 and the surface of the second area 202 thereof may face the same direction (e.g., face away from the front surface of the electronic device 10) while forming an angle of 180 degrees. The folding area 203 may form the same plane together with the first area 101 and the second area 202.

When the electronic device 101 is in a folded state, as illustrated in FIG. 3, the first housing structure 310 and the second housing structure 320 may be arranged to face each other. The surface of the first area 101 of the display 200 and the surface of the second area 202 thereof may face each other while forming a narrow angle (e.g., an angle between 0 degrees and 10 degrees). At least part of the folding area 203 may form a curved surface having a predetermined curvature.

When the electronic device 101 is in an intermediate state, the first housing structure 310 and the second housing structure 320 may be arranged to have a certain angle therebetween. The surface of the first area 101 of the display 200 and the surface of the second area 202 thereof may form an angle that is greater than that in the folded state and is smaller than that in the flat state. At least part of the folding area 203 may form a curved surface having a predetermined curvature, and the curvature may be smaller than that in the folded state.

At least one of the first housing structure 310 and the second housing structure 320 may include at least one reception coil for receiving power from a transmission coil of a wireless power transmission device.

According to an embodiment, an electronic device may include a hinge; a first housing structure including a first face that faces a first direction, and a third face that faces a second direction opposite the first direction; a second housing structure including a second face that faces a third direction substantially the same as the first direction, and a fourth face that faces a fourth direction opposite the third direction, the second housing structure being folded about the hinge so as to face the first housing structure; a flexible display extending from the first face to the second face; at least one sensor circuit configured to sense an angle formed by the first housing structure and the second housing structure; and a processor operatively connected to the flexible display and the sensor circuit. The processor may be configured to detect a physical state of the first housing structure and the second housing structure based on the at least one sensor circuit; and re-execute, when the physical state is changed in a state in which the application is being executed, the application under execution, and the physical state may include a first state in which the first housing structure and the second housing structure face each other or a second state in which the first housing structure and the second housing structure face the same direction.

The first state may include at least one of the state in which the first face of the first housing structure and the second face of the second housing structure are disposed to face each other or the state in which the third face of the first housing structure and the fourth face of the second housing structure are disposed to face each other.

The processor may be configured to output a restart guide for inducing application restart to at least a portion of an execution screen of the application under execution before re-executing the application under execution; and re-execute the application under execution in response to receiving an input related to the re-execution.

The processor may be configured to change the execution screen to a predetermined resolution and output the changed execution screen in a state in which the application is being executed; and output the restart guide to at least a portion of the execution screen output at the predetermined resolution.

The flexible display may further include a touch circuit configured to sense a touch, and the processor may be configured to output a resolution change notification before outputting the execution screen at the predetermined resolution. For example, the resolution change notification may be output in the state in which the touch circuit is deactivated.

The processor may be configured to maintain output of the execution screen changed to the predetermined resolution in response to not receiving an input related to the re-execution.

The first housing structure may include a first display, the second housing structure may include a second display, and the processor may be configured to re-execute the application such that the execution screen is output through one of the first display and the second display in response to the physical state change.

The processor may be configured to output an unfolding guide that induces a change to the second state based on the type of the application under execution in response to sensing a change to the first state.

The processor may be configured to re-execute the application such that an execution screen corresponding to the second state is output when the change to the second state is sensed in a state in which the unfolding guide is output.

The processor may be configured to change the execution screen to a predetermined resolution and output the changed screen in the state in which the application is being executed to correspond to the first state when the change to the second state is not sensed in the state in which the unfolding guide is output.

Figure 4:
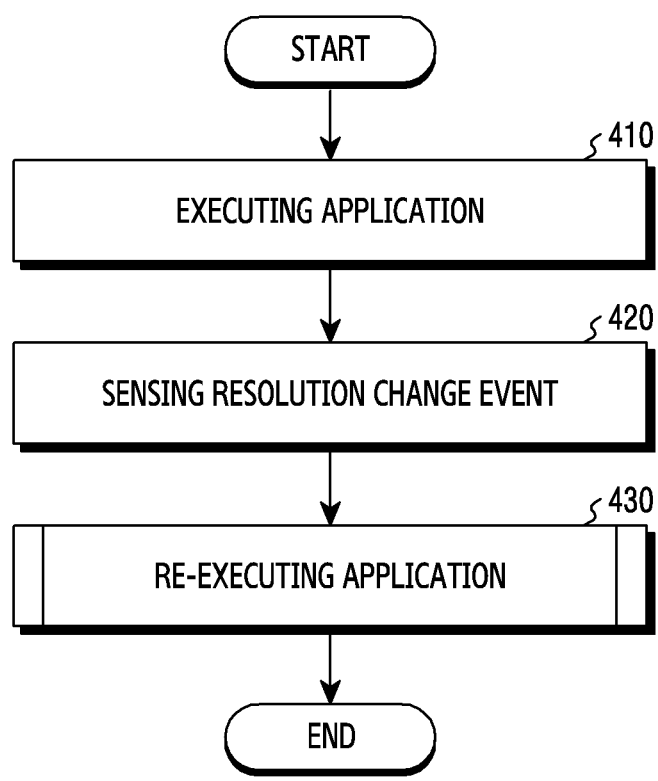
FIG. 4 is a flowchart illustrating a method of controlling a UI based on a mechanical state change of an electronic device according to an embodiment.
Figure 5A:
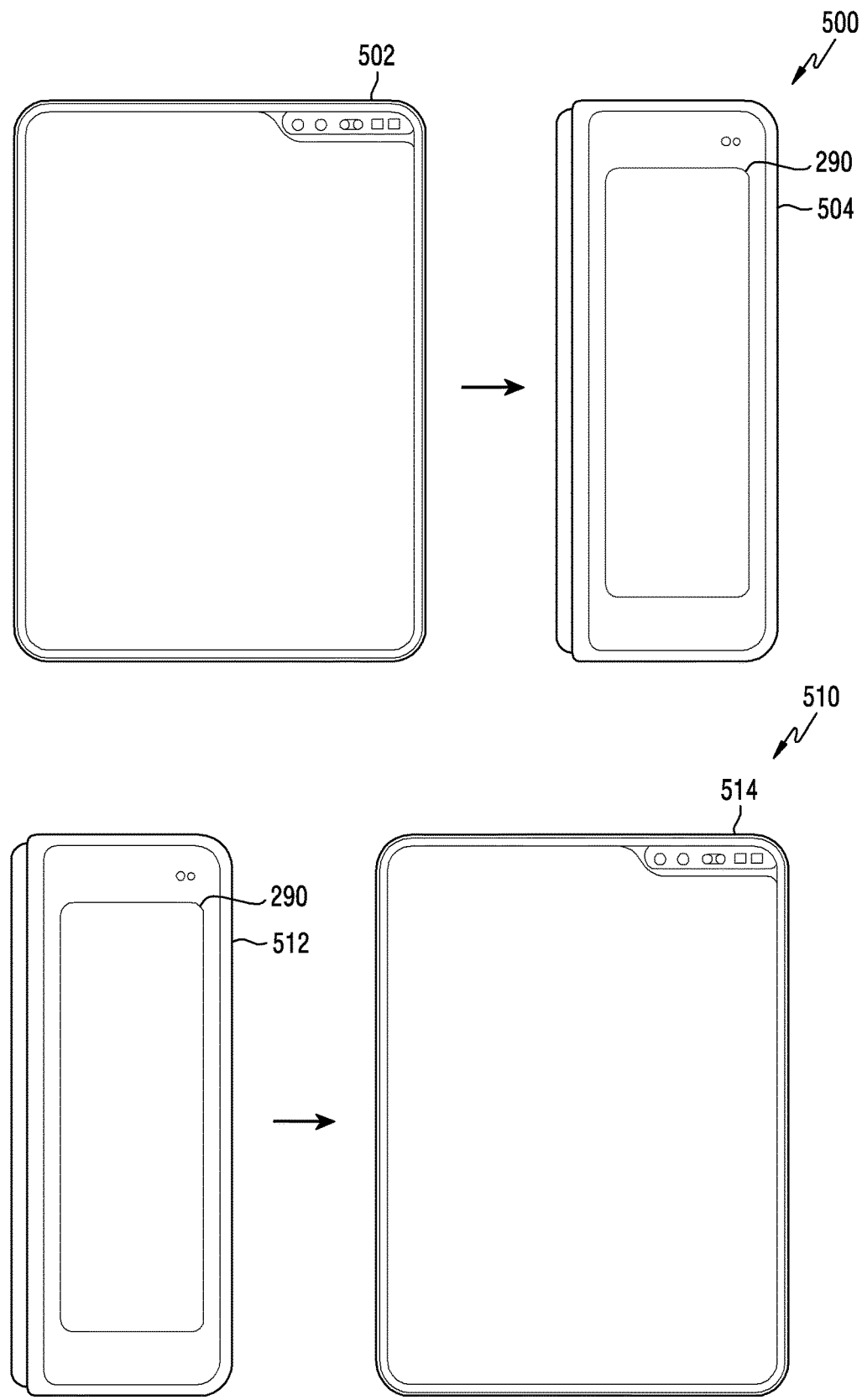
FIG. 5A illustrates a resolution change event of an electronic device according to an embodiment.
Figure 5B:
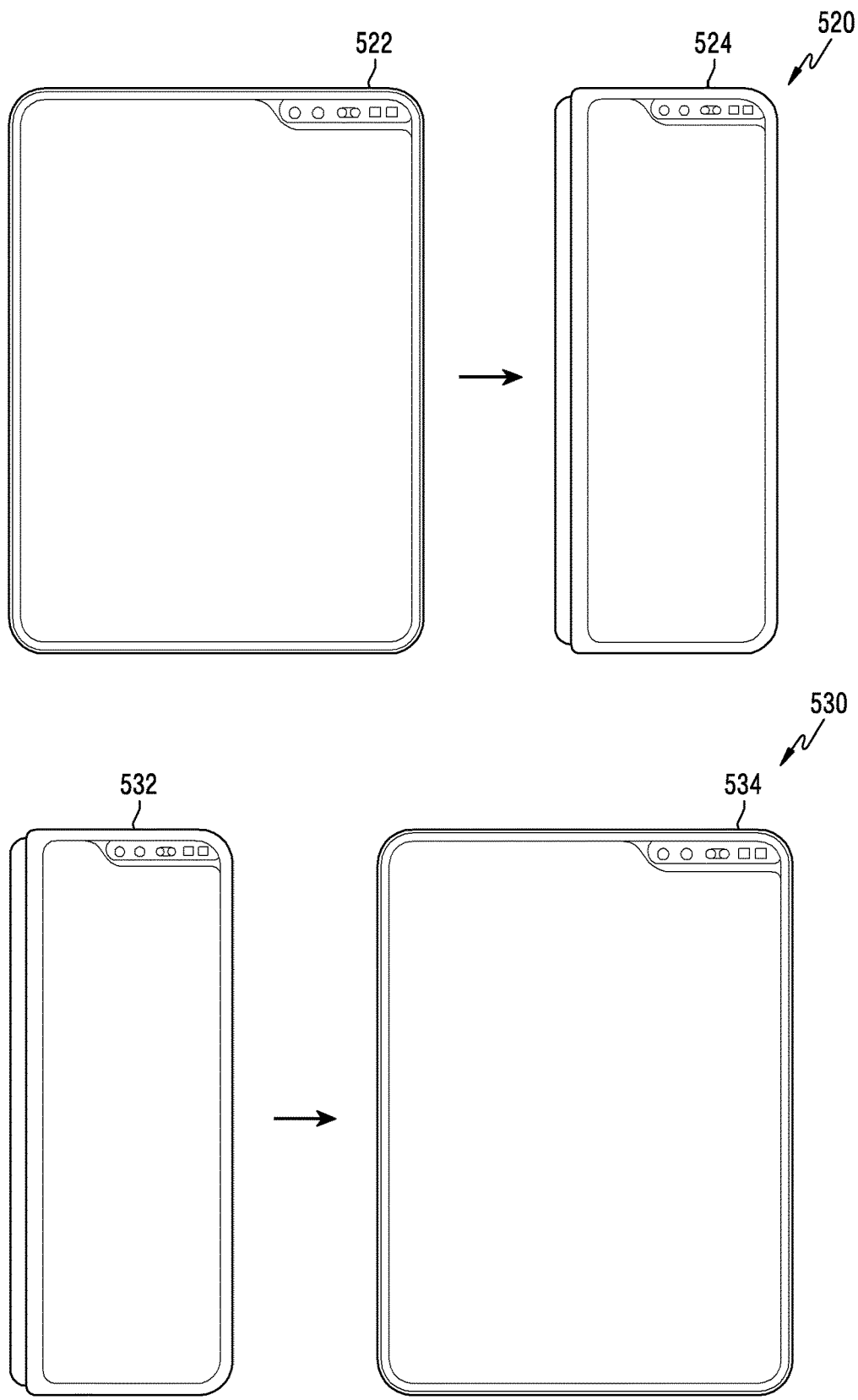
FIG. 5B illustrates a resolution change event of an electronic device according to an embodiment.

FIG. 4 is a flowchart illustrating a method of controlling a UI based on a mechanical state change in an electronic device according to an embodiment. FIG. 5A illustrates a resolution change event of an electronic device according to an embodiment, and FIG. 5B illustrates a resolution change event of an electronic device according to an embodiment. In the following embodiments, respective operations may be performed sequentially, but are not necessarily performed sequentially. For example, the order of respective operations may be changed, and at least two operations may be performed in parallel.

Referring to FIG. 4, an electronic device (e.g., the processor 102 in FIG. 1) executes an application in step 410. The processor 120 may execute an application while the electronic device is in the folded state or while the electronic device is in the unfolded state. For example, the processor 120 may output an application execution screen through a sub-display while the electronic device is physically closed. As another example, the processor 120 may output the application execution screen through a main display while the electronic device is physically expanded.

The electronic device senses a resolution change event in step 420. As described above, the resolution change event may include changing the state of the electronic device from one of the physically closed state and the physically expanded state to the other state. As described above with reference to FIG. 2, the foldable housing of the electronic device may include a first housing structure and a second housing structure. In addition, each of the first housing structure and the second housing structure may include a first face (e.g., the front face) and a second face (e.g., the rear face), and a display may extend from the first face of the first housing structure and the first face of the second housing structure.

Referring to FIG. 5A, as illustrated in operation 500, when the electronic device is switched (folder) from a substantially flat state (502) into the folder state (504), wherein the first face of the first housing structure and the first face of the second housing structure are disposed to face each other, the processor 120 may determine that the electronic device is in the physically closed state.

Similarly, as illustrated in operation 510, when the electronic device is switched (unfolded) from the folded state (e.g., the second face 290 of the second housing structure is exposed) (512) into the unfolded state (514), the processor 120 may determine that the electronic device is in the physically expanded state.

Referring to FIG. 5B, as illustrated in operation 520, when the electronic device is switched (folded) from the unfolded state (522) into the folded state (524), the processor 120 may determine that the electronic device is in the physically closed state.

As illustrated in operation 530, when the electronic device is switched (unfolded) from the folded state (532) into the unfolded state (534), the processor 120 may determine that the electronic device is in the physically expanded state.

Referring again to FIG. 4, in step 430, the electronic device may perform restart (e.g., re-executing) the application in response to sensing a resolution change event in step 420. For example, the processor 120 may change the display on which the application execution screen is output from the main screen to the sub-screen or from the sub-screen to the main screen in response to the resolution change event. In addition, the processor 120 may restart the application to correspond to the resolution of the display in which the resolution of the execution screen of the application is changed.

Figure 5C:
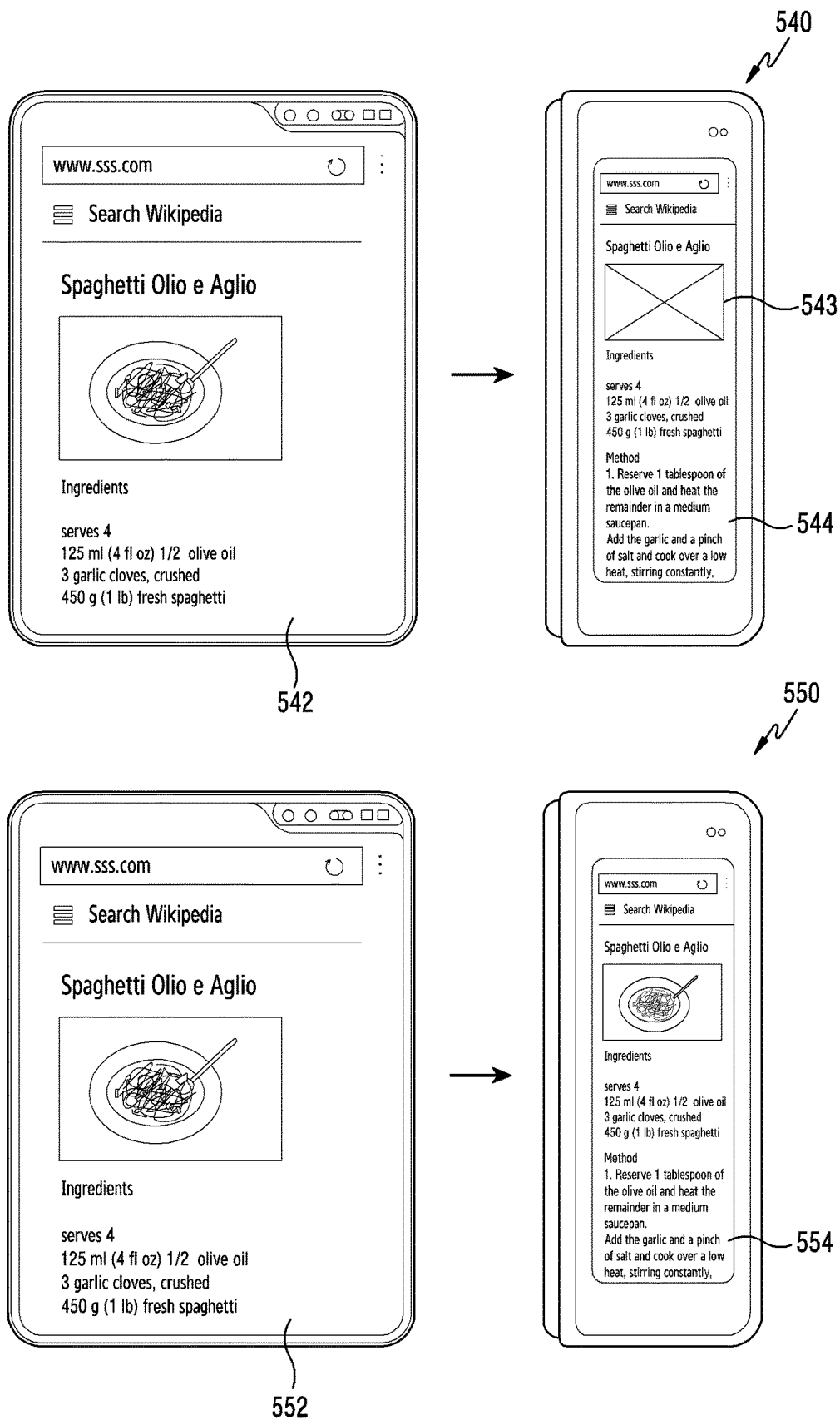
FIG. 5C illustrates a comparison of an operation of controlling a UI of a conventional electronic device and an operation of controlling a UI of an electronic device according to an embodiment.
Figure 5D:
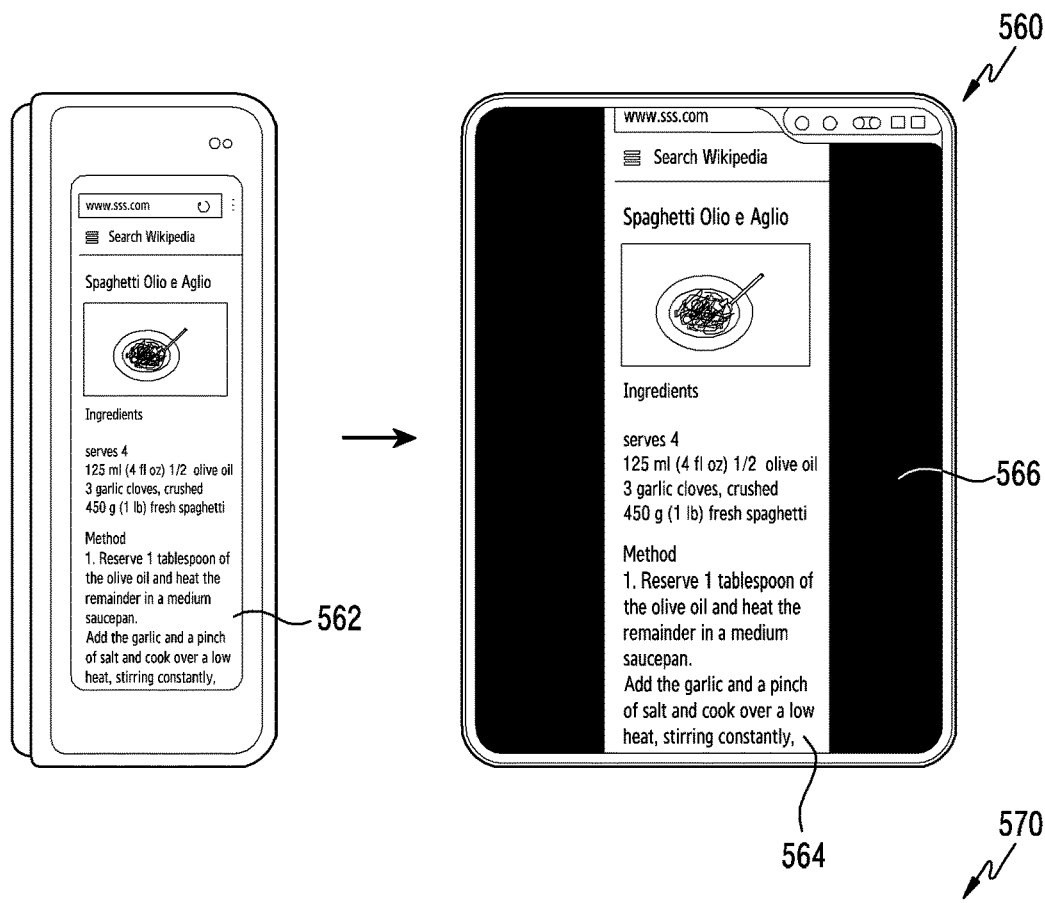
FIG. 5D illustrates a comparison of an operation of controlling a UI of a conventional electronic device and an operation of controlling a UI of an electronic device according to an embodiment.
Figure 5D:
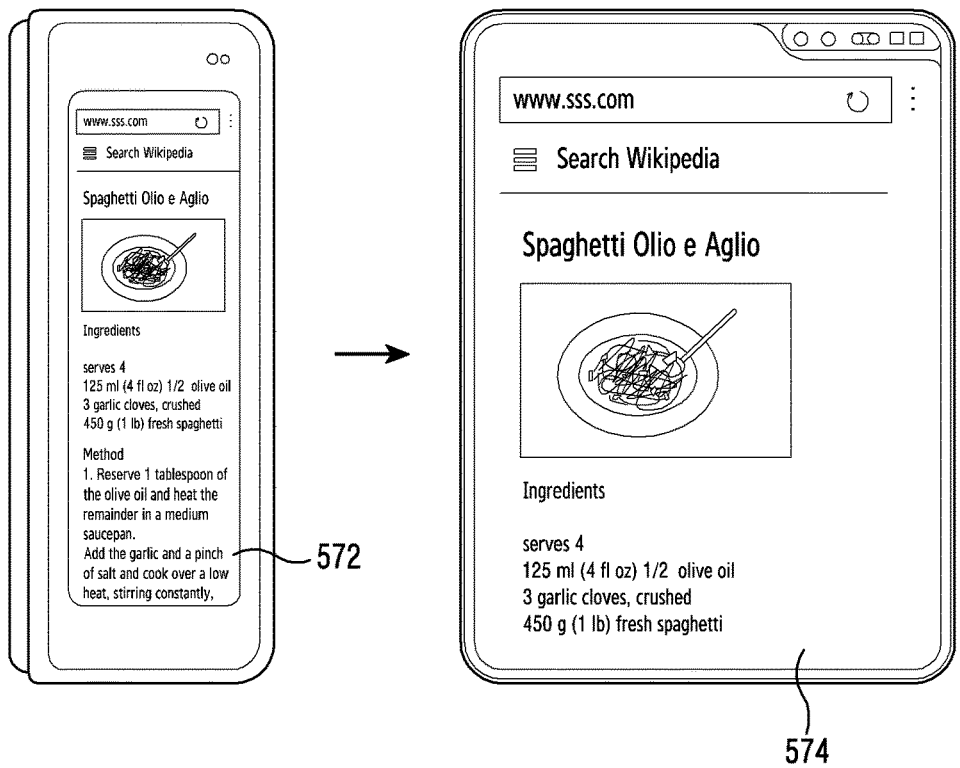

FIG. 5C illustrates a comparison of an operation of controlling a UI of a conventional electronic device and an operation of controlling a UI of an electronic device according to an embodiment. FIG. 5D illustrates a comparison of an operation of controlling a UI of a conventional electronic device and an operation of controlling a UI of an electronic device according to an embodiment.

Referring to FIG. 5C, in operation 540, a conventional electronic device changes the display on which an application execution screen is output from a main screen to a sub-screen in response to a physical state and/or a physical state change of the electronic device during application execution. More specifically, the conventional electronic device changes the resolution of the application execution screen 542 to correspond to the display changed in response to the physical state and/or the physical state change (544). The conventional electronic device may adjust the horizontal and vertical directions of the execution screen such that the execution screen is output without a blank space in the changed display. However, as illustrated, in the execution screen in which the horizontal and vertical directions are adjusted, a problem may occur in that the position at which the screen configuration (e.g., a control menu) is disposed is misaligned or at least a part of the screen (e.g., an image or a screen frame) is abnormally output (543). Although FIG. 5C illustrates an image being abnormally output, this is merely an example, and the disclosure is not limited thereto.

Referring to FIG. 5D, as illustrated in operation 560, a conventional electronic device may change the display on which an application execution screen is output from the sub-screen to the main screen in response to a physical state and/or a physical state change of the electronic device during application execution. The conventional electronic device may output the execution screen 562 of the application executed based on the display characteristics of the changed main display (e.g., the supported resolution, size, and aspect ratio) in the state in which the height and width thereof are enlarged to match the size of the changed main display (564). In this case, as illustrated, a problem may occur in that an empty space (e.g., a shaded portion) 566 in which the execution screen is not output occurs in at least a part of the main display.

Referring to again FIG. 5C and FIG. 5D, as illustrated in operations 550 and 570, an electronic device according to an embodiment of the disclosure may prevent an execution screen from being abnormally output through a display changed in response to a physical state and/or a physical state of the electronic device generated during application execution. Specifically, the electronic device may perform a process for re-executing the application under execution such that an execution screen 554 or 574 corresponding to the changed display is output in respond to sensing a physical state and/or a physical state change of the electronic device generated at least during application execution (552) or (572). For example, the electronic device may output guide information for re-executing the application or inducing application re-execution such that an execution screen is normally output through the changed display.

Figure 6:
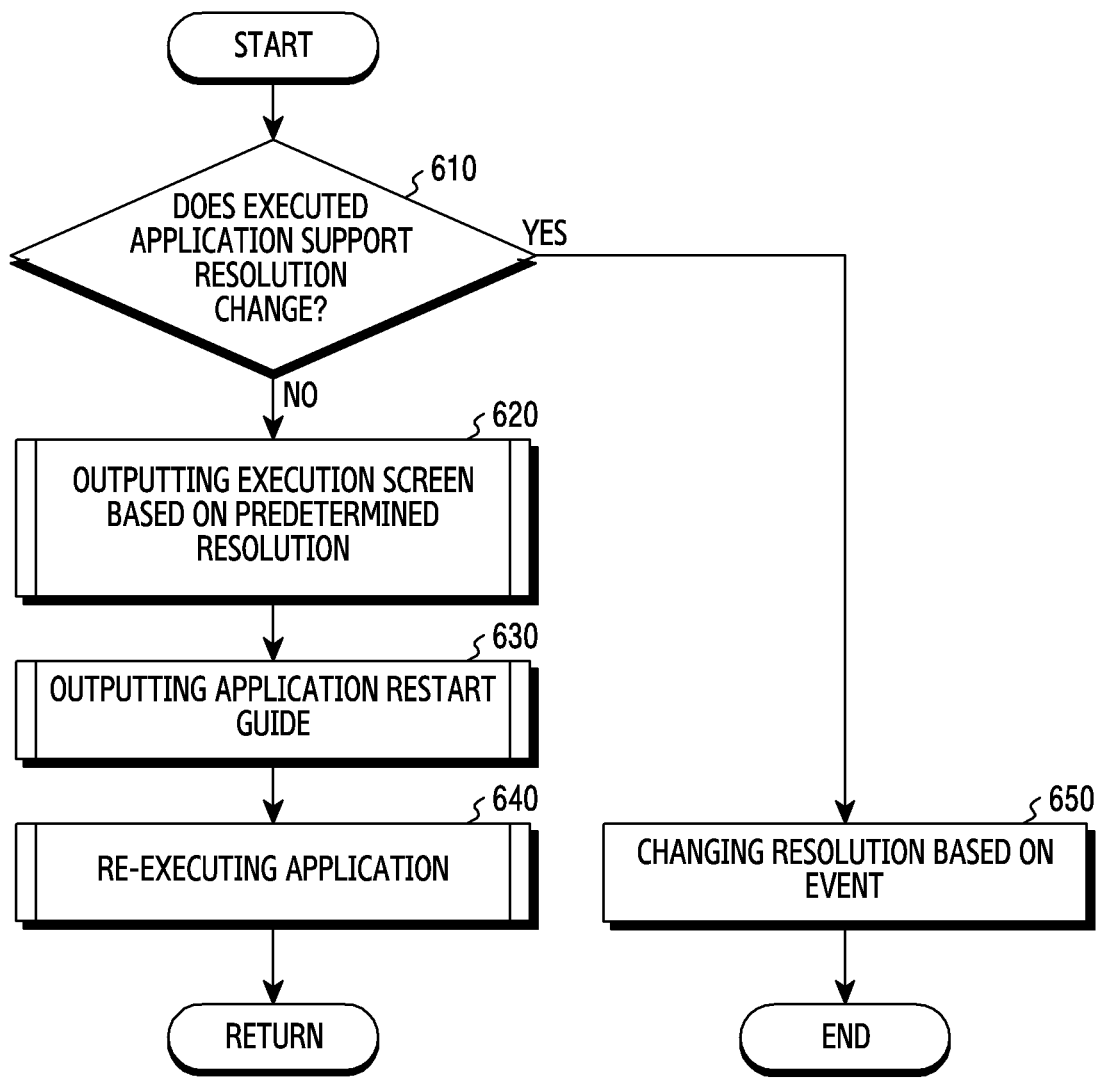
FIG. 6 is a flowchart illustrating a method for re-executing an application in an electronic device according to an embodiment.

FIG. 6 is a flowchart illustrating a method for re-executing an application in an electronic device according to an embodiment. The method of FIG. 6 may correspond to step 430 in FIG. 4.

Referring to FIG. 6, an electronic device (e.g., the processor 102 in FIG. 1) according to an embodiment determines whether an application under execution supports a resolution change in step 610. The resolution change may include a function of automatically adjusting the resolution of the execution screen in the state in which the application is being executed based on the size of the display changed in response to a resolution change event. Whether or not a resolution change is supported may be recorded in the metadata of an application, and the processor 120 may determine whether an application supports the resolution change based on the metadata of the application under execution.

When the application under execution does not support the resolution change, the electronic device outputs an execution screen based on a predetermined resolution in step 620. The predetermined resolution may include a first predetermined resolution at which the horizontal and vertical directions of the execution screen are adjusted such that the execution screen is output without a blank space in the display based on the size of the main display or the sub-display. In addition, the predetermined resolution may include a second predetermined resolution at which the horizontal and vertical directions of the execution screen are adjusted based on the aspect ratio of the main display or the sub-display. The processor 120 may change the resolution of the execution screen to a predetermined resolution so as to correspond to the changed display without re-executing the executed application. For example, the processor 120 may reduce the height and width of the execution screen of the application executed based on the display characteristics of the changed main display (e.g., the supported resolution, size, and aspect ratio) to match the size of the changed sub-display. As another example, the processor 120 may enlarge the height and width of the execution screen of the application executed based on the display characteristics of the changed sub-display (e.g., the supported resolution, size, and aspect ratio) to match the size of the changed main display.

In step 630, the electronic device provides an application restart guide. As described above, the application restart guide may include information for notifying that an application under execution may be abnormally operated by a resolution change of the execution screen according to the physical state change of the electronic device. In addition, the application restart guide may include information for inducing the restart of the application in order to prevent the application under execution from operating abnormally.

Figure 7:
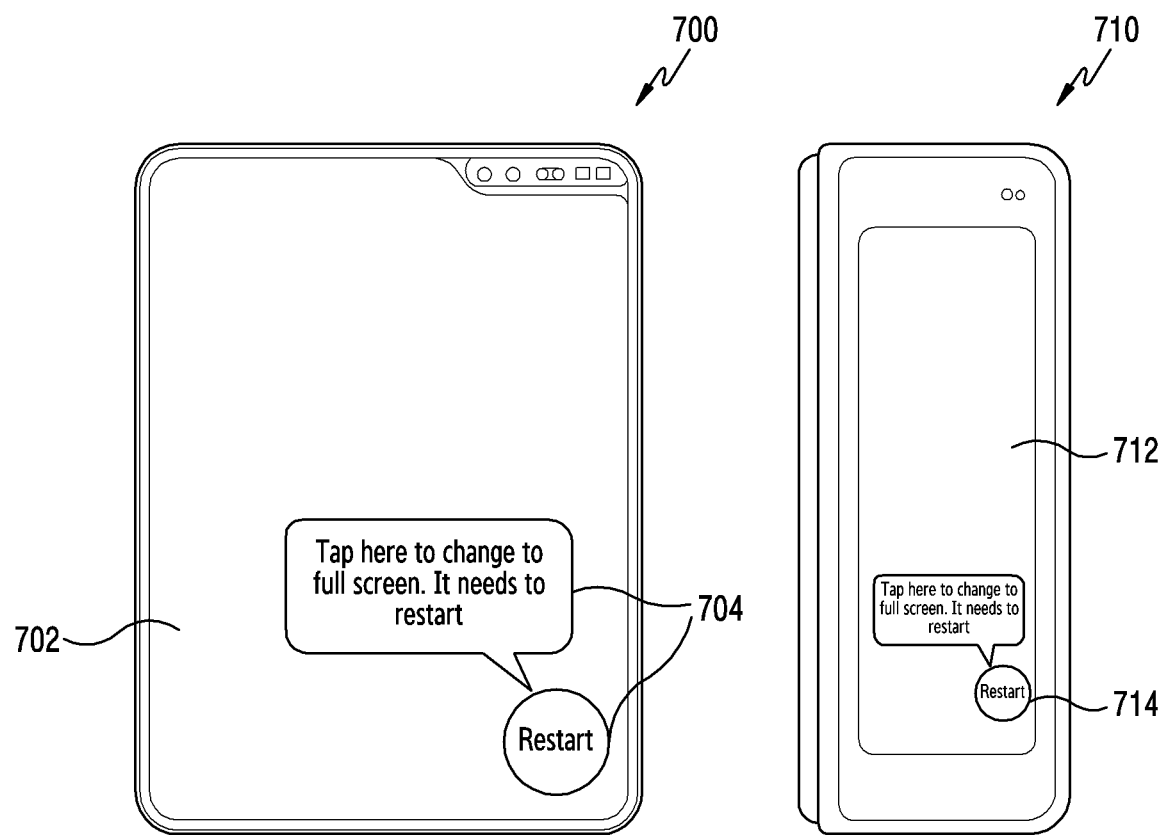
FIG. 7 illustrates an application restart guide output from an electronic device according to an embodiment.

FIG. 7 illustrates an application restart guide output from an electronic device according to an embodiment.

Referring to FIG. 7, the unfolded state 700, the processor 120 may perform control such that, in the physically expanded state, an application restart guide 704 is provided in at least a part of an application execution screen 702, which is changed to a predetermined resolution and output.

Additionally, in the folded state 710, the processor 120 may perform control such that, in the physically closed state, an application restart guide 714 is provided in at least a portion of an application execution screen 712, which is changed to a predetermined resolution and output. At least a part of the execution screen provided with the application restart guide may include a portion in which a control menu for the electronic device (or an execution screen) is disposed (e.g., a navigation bar).

Referring again to FIG. 6, in step 640, the processor 102 performs control such that the application under execution is restarted. For example, when the physical state of the electronic device is the expanded (or unfolded) state, the processor 120 may perform control such that the application is restarted such that the execution screen is output at a resolution corresponding to the size of the main display. As another example, when the physical state of the electronic device is the closed (or folded) state, the processor 120 may perform control such that the application is restarted such that the execution screen is output at a resolution corresponding to the size of the sub-display.

When the application under execution supports a resolution change in step 610, the electronic device changes the resolution of the application execution screen based on an event in step 650. The processor 120 may adjust the horizontal and vertical directions of the execution screen in the state in which the application is executed such that the execution screen output through the main screen is output through the sub-screen in response to sensing a predetermined event (e.g., the state in which the electronic device is closed) so as to output the execution screen through the sub-display. Alternatively, the processor 120 may adjust the horizontal and vertical directions of the execution screen in the state in which the application is executed such that the execution screen output through the sub-screen is output through the main screen in response to sensing a predetermined event (e.g., the state in which the electronic device is expanded) so as to output the execution screen through the main display.

Figure 8:
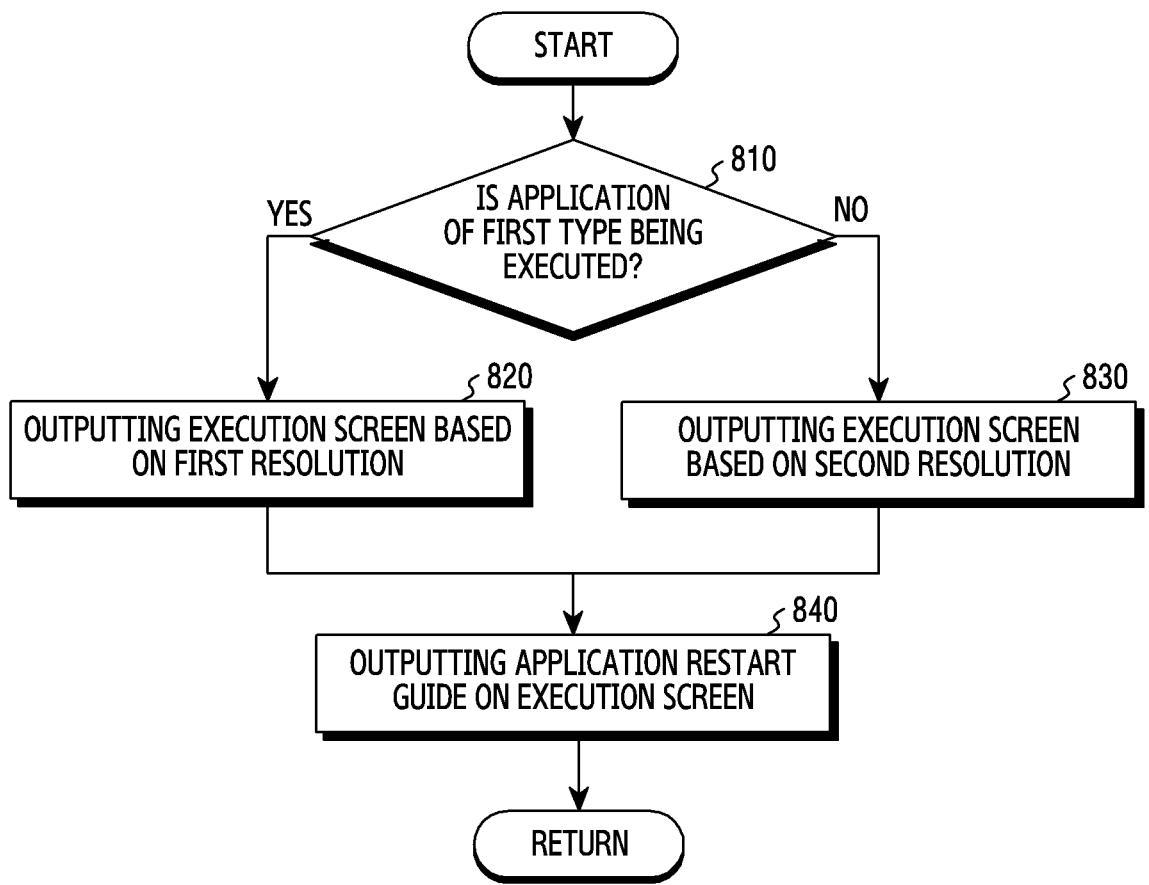
FIG. 8 is a flowchart illustrating a method for providing an application restart guide in an electronic device according to an embodiment.

FIG. 8 is a flowchart illustrating a method for providing an application restart guide in an electronic device according to an embodiment. The method of FIG. 8 may correspond to steps 620 and 630 in FIG. 6.

Referring to FIG. 8, an electronic device (e.g., the processor 102 in FIG. 1) according to an embodiment determines the type of an executed application in step 810. As described above, the application type may include a first application type defined to change the execution screen to a first predetermined resolution when sensing a resolution change event and a second application type defined to change the execution screen to a second predetermined resolution when sensing a resolution change event.

Figure 9A:
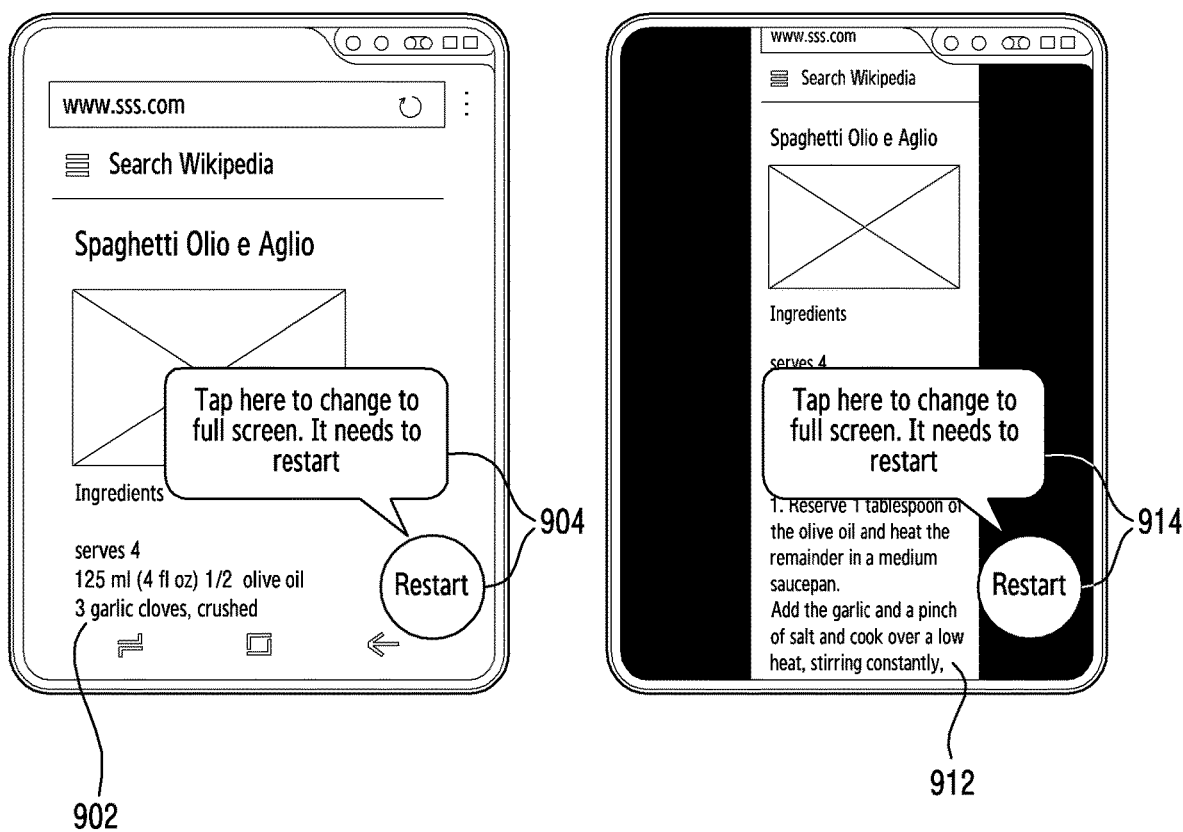
FIG. 9A illustrates an application restart guide output on an execution screen changed to a predetermined resolution in an electronic device according to an embodiment.

In step 820, when an application of a first type is being executed, the electronic device outputs an execution screen based on a first predetermined resolution. FIG. 9A, as illustrated in screen 902, the first predetermined resolution may include a resolution at which the horizontal and vertical directions of the execution screen are adjusted such that the execution screen is output without a blank space in the display based on the size of the main display or the sub-display.

Referring again to FIG. 8, when an application of a second type is being executed, the electronic device outputs an execution screen based on a second predetermined resolution in step 830.

Referring again to FIG. 9A, as illustrated in screen 912, the second predetermined resolution may include a resolution at which the horizontal and vertical directions of the execution screen are adjusted based on the aspect ratio of the main display or the sub-display. When the second resolution is output, at least a portion of the display may include a blank space (e.g., a shaded portion) in which the execution screen is not output.

Referring again to FIG. 8, when the execution screen is output based on the first predetermined resolution or the second predetermined resolution, the electronic device outputs an application restart guide to at least a portion of the execution screen in step 840.

Referring again to FIG. 9A, the electronic device may output the application restart guide 904 to at least a portion of the execution screen that is output based on the first predetermined resolution. For example, the application restart guide may be output in various types such as a popup type and a floating type. Alternatively, the electronic device may output an application restart guide to at least a portion of the execution screen that is output based on the second predetermined resolution (914).

Figure 9B:
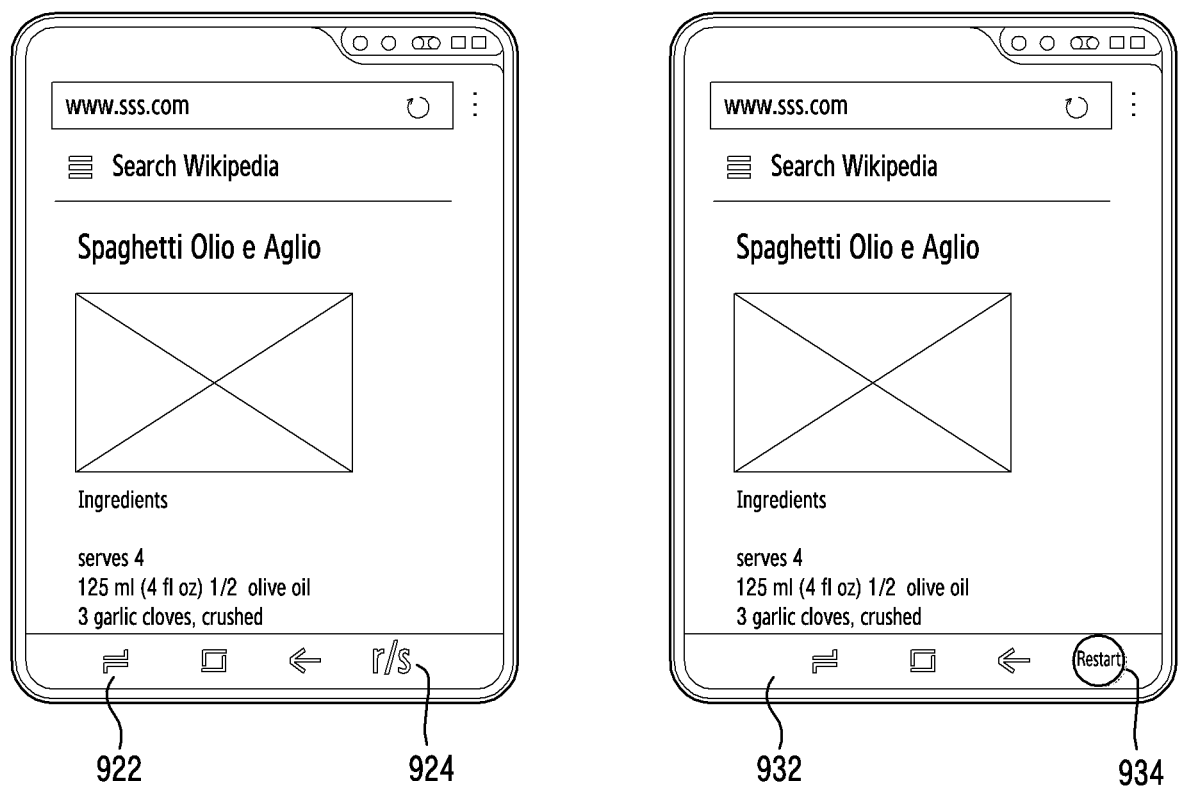
FIG. 9B illustrates an application restart guide output on an execution screen changed to a predetermined resolution in an electronic device according to an embodiment.

FIG. 9B illustrates an application restart guide output on an execution screen changed to a predetermined resolution in an electronic device according to an embodiment.

Referring to FIG. 9B, the electronic device may output an application guide in the form of a control button included in a portion in which a control menu for the electronic device (or an execution screen) (e.g., a navigation bar) 922 (924), or may output an application guide to a navigation bar 932 in various types such as a popup type or a floating type (934). Although FIGS. 9A and 9B illustrate an application restart guide output while the electronic device is in the unfolded state, this is merely illustrative, and the disclosure is not limited thereto.

Figure 9C:
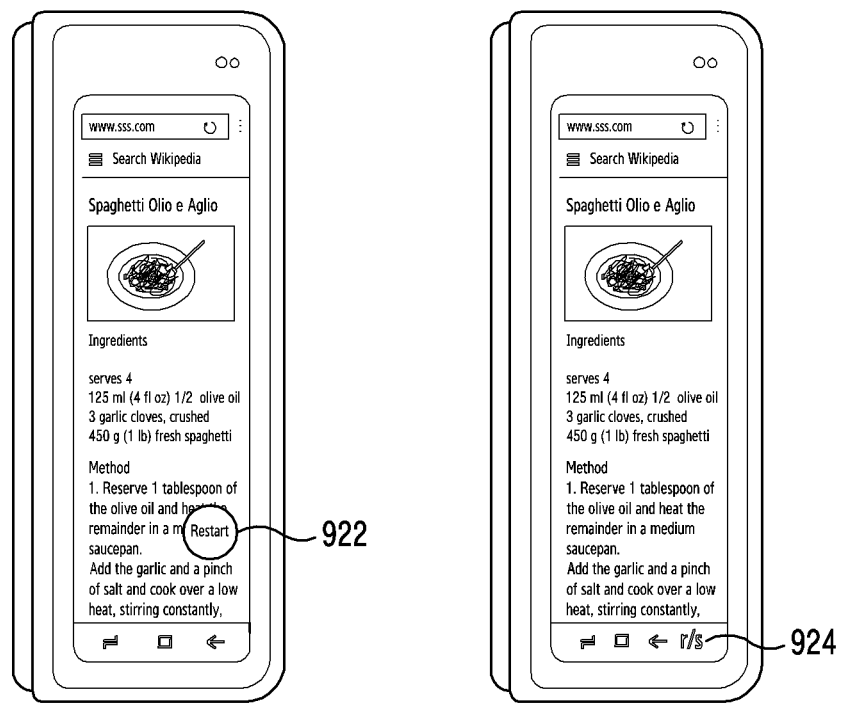
FIG. 9C illustrates an application restart guide output on an execution screen changed to a predetermined resolution in an electronic device according to an embodiment.

FIG. 9C illustrates an application restart guide output on an execution screen changed to a predetermined resolution in an electronic device according to an embodiment.

Referring to FIG. 9C, as illustrated in 922 and 924, the above-described application restart guide may be identically or similarly applied even when the electronic device is folded.

Figure 10:
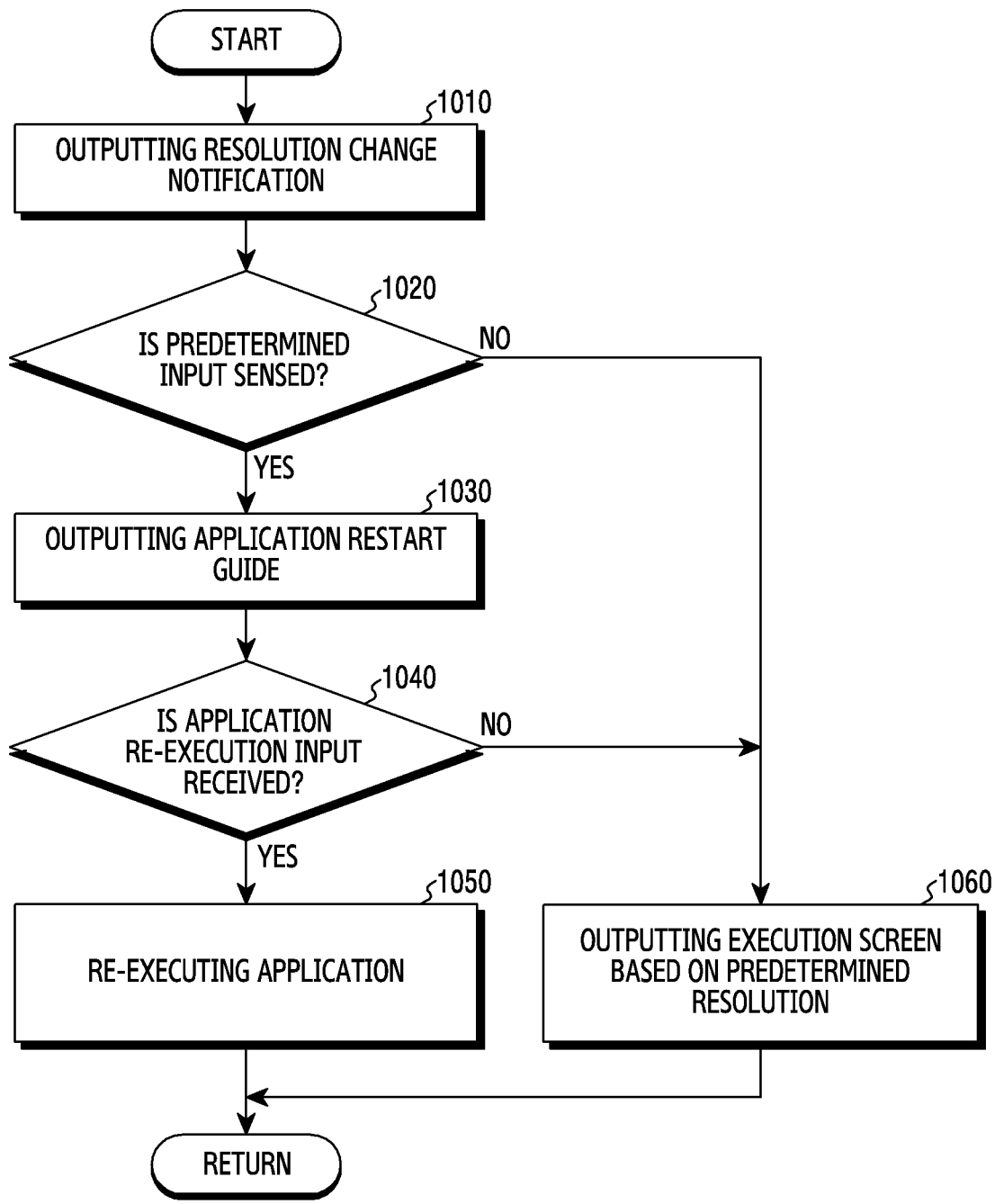
FIG. 10 is a flowchart illustrating a method for restarting an application in an electronic device according to an embodiment.

FIG. 10 is a flowchart illustrating a method for restarting an application in an electronic device according to an embodiment. The operations of FIG. 10 may correspond to steps 620 to 640 in FIG. 6.

Referring to FIG. 10, in step 1010, an electronic device (e.g., the processor 102 in FIG. 1) outputs a resolution change notification in response to sensing a resolution change event. The resolution change notification may be information for notifying that an execution screen output through the main display (or the sub-display) is changed to a predetermined resolution and output through the sub-display (or main display) in response to the resolution change event.

Figure 11A:
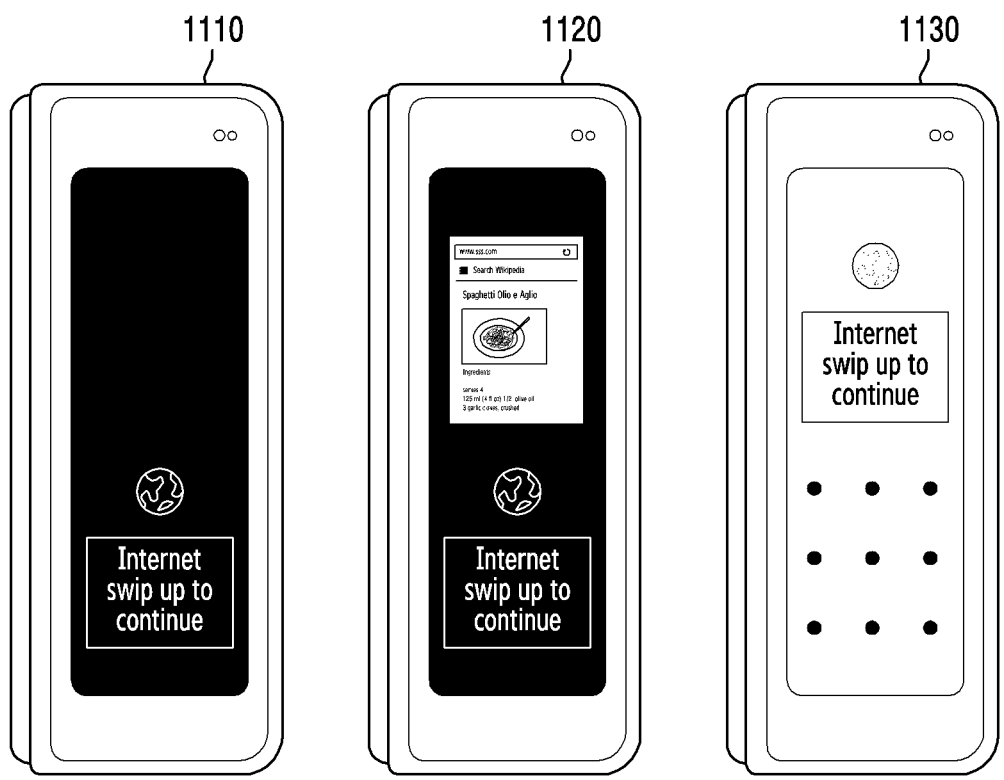
FIG. 11A illustrates a resolution change notification output from an electronic device according to an embodiment.

FIG. 11A illustrates a resolution change notification output from an electronic device according to an embodiment.

Referring to FIG. 11A, the electronic device may output a resolution change notification in the state in which the display is deactivated. Display deactivation may include powering off the display or operating the display in a predefined manner (e.g., lowering the resolution or screen brightness). In screen 1110, the electronic device outputs information (e.g., icons or text) regarding an application of which the resolution is changed and information for inducing an input (e.g., a swipe input) to change a resolution. In screen 1120, the electronic device outputs information (e.g., icons or text) regarding an application of which the resolution is changed and information for inducing an input for changing a resolution, although information (e.g., a capture screen) is displayed on a screen of which the resolution is changed.

As illustrated in screen 1130, the electronic device outputs a resolution change notification while a lock screen is activated. Although FIG. 11A illustrates outputting a resolution change notification while the electronic device is folded, this is merely illustrative, and disclosure is not limited thereto.

Figure 11B:
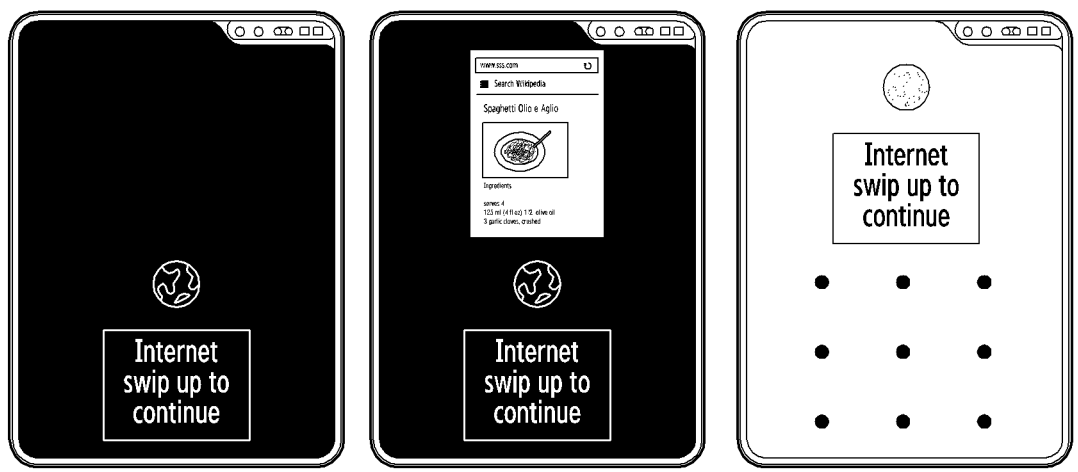
FIG. 11B illustrates a resolution change notification output from an electronic device according to an embodiment.

FIG. 11B illustrates a resolution change notification output from an electronic device according to an embodiment.

Referring to FIG. 11B, the above-described resolution change notification may be identically or similarly applied even while the electronic device is unfolded.

Referring again to FIG. 10, in step 1020, the electronic device determines whether a predetermined input is sensed while the resolution change notification is output. The predetermined input may include an input for changing the resolution.

In step 1030, when a predetermined input is sensed, the electronic device outputs an application restart guide. The electronic device may output an application execution screen based on a predetermined resolution, and may output the application restart guide to at least a portion of the output application execution screen. Alternatively, the electronic device may omit an operation of outputting an application execution screen based on a specified resolution, and may output an application restart guide.

In step 1040, the electronic device determines whether or not an input for instructing application restart is received. For example, the input for instructing restart may be an input for selecting an application restart guide.

In step 1050, when an input for instructing application restart is received, the electronic device performs an operation of restarting the currently executed application. For example, as described above, the electronic device may re-execute an application such that an execution screen output through the main display (or the sub-display) may be output through the sub-display (or the main display) in response to a resolution change event.

However, when a predetermined input is not sensed in step 1020 or an input for instructing application restart is not received in step 1060, the electronic device performs an operation of outputting the execution screen of the application under execution based on a predetermined resolution in step 1060. For example, as described above, when the electronic device is in the unfolded state, the electronic device may automatically adjust the resolution of the execution screen of the application based on the size of the main display. As another example, when the electronic device is in the folded state, the electronic device may automatically adjust the resolution of the execution screen of the application based on the size of the sub-display.

Figure 12:
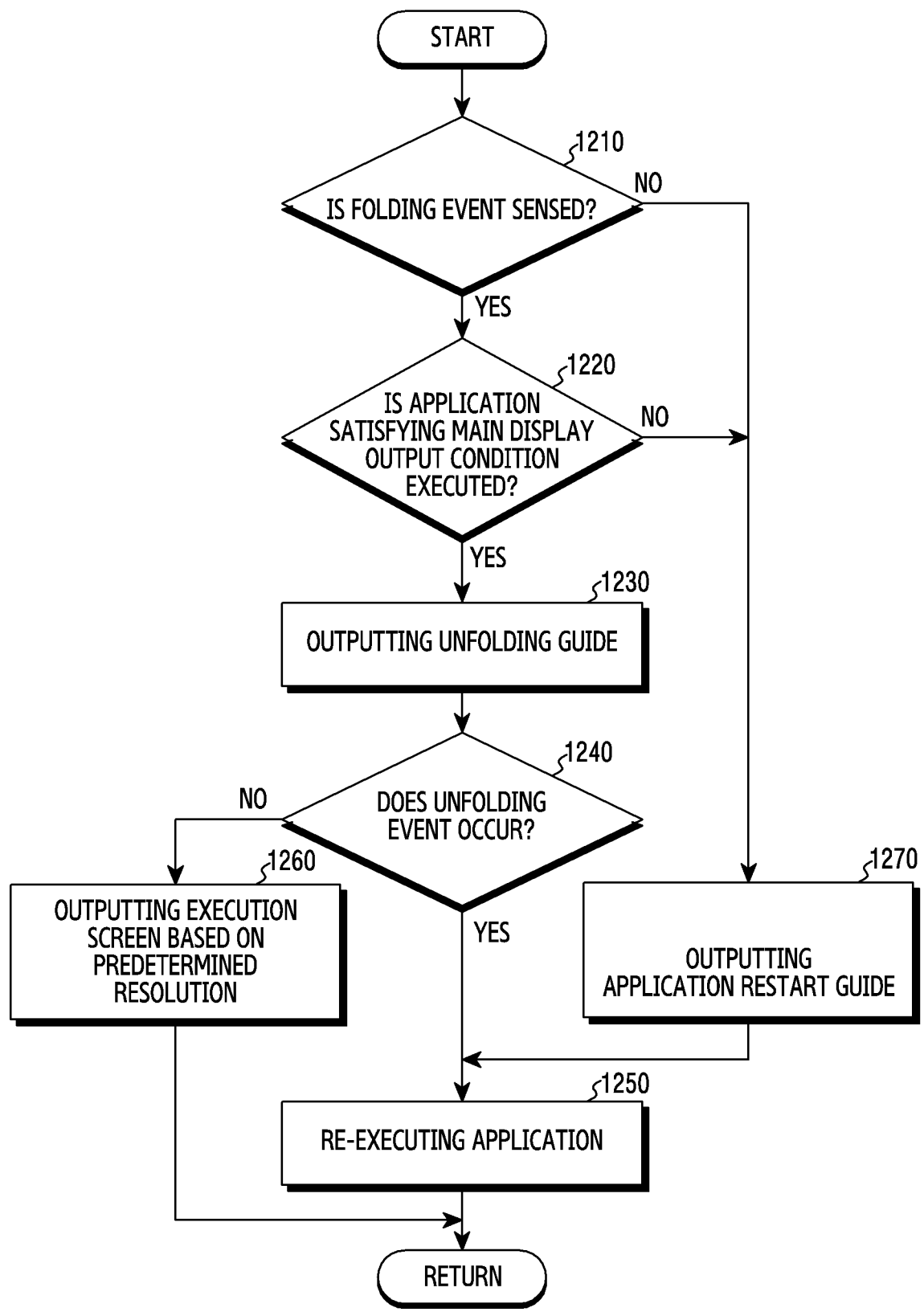
FIG. 12 is a flowchart illustrating a method for providing an unfolding guide in an electronic device according to an embodiment.

FIG. 12 is a flowchart illustrating a method for providing an unfolding guide in an electronic device according to an embodiment. The method of FIG. 10 may correspond to steps 620 to 640 in FIG. 6.

Referring to FIG. 12, an electronic device (e.g., the processor 102 in FIG. 1) according to an embodiment determines the type of a sensed resolution change event in step 1210. As described above, the resolution change event may include the folded state of the electronic device and the unfolded state of the electronic device.

When the electronic device is in the folded state, the electronic device determines whether or not an application that satisfies a main display output condition is being executed in step 1220. For example, the electronic device may determine whether or not an application that does not support the resolution of the sub-display having a smaller size than the main display is executed.

When an application that satisfies a main display output condition is being executed, the electronic device outputs an unfolding guide in step 1230. The unfolding guide may include information for notifying that the currently executed application does not support the sub-display and is optimized for the main display.

Figure 13:
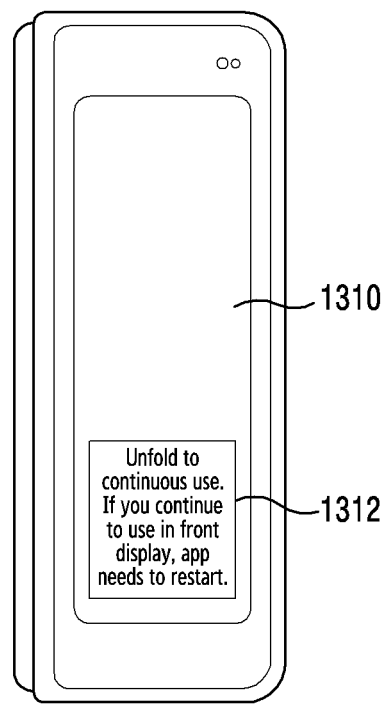
FIG. 13 illustrates an unfolding guide output from an electronic device according to an embodiment.

FIG. 13 illustrates an unfolding guide output from an electronic device according to an embodiment.

Referring to FIG. 13, the electronic device may induce the electronic device to be in the physically expanded state by outputting an unfolding guide 1312 to at least a portion of the execution screen 1310 output based on a predetermined resolution.

Referring again to FIG. 12, in step 1230, the electronic device determines whether or not an unfolding event is sensed while the unfolding guide is output or after the unfolding guide is output.

When the unfolding event is sensed, the electronic device executes an application re-execution operation in step 1250. For example, the electronic device may restart an application such that an execution screen is output at a resolution corresponding to the size of the main display.

However, when an unfolding event is not sensed in step 1240, the electronic device outputs an execution screen based on a predetermined resolution in step 1260. For example, the electronic device may output an execution screen having a predetermined resolution through the sub-display in response to the state in which the electronic device is physically closed.

When the electronic device is determined to be physically expanded in step 1210, the electronic device outputs an application restart guide such that an execution screen is output at a resolution corresponding to the size of the main display in step 1270. The electronic device may perform an application re-execution operation after outputting the application restart guide.

When an application that does not satisfy a main display output condition is being executed in step 1220, the electronic device outputs an application restart guide such that an execution screen is output at a resolution corresponding to the size of the sub-display in step 1270. The electronic device may perform an application re-execution operation after outputting the application restart guide.

According to an embodiment, a method of operating an electronic device includes detecting a physical state of a first housing structure and a second housing structure of the electronic device based on at least one sensor circuit; and re-executing, when the physical state is changed in a state in which the application is being executed, the application under execution. The physical state includes a first state in which the first housing structure and the second housing structure face each other or a second state in which the first housing structure and the second housing structure face a same direction.

The first state includes at least one of the state in which the first face of the first housing structure and the second face of the second housing structure are disposed to face each other or the state in which the third face of the first housing structure and the fourth face of the second housing structure are disposed to face each other.

Re-executing the application under execution includes outputting a restart guide for inducing application restart to at least a portion of an execution screen of the application under execution before re-executing the application under execution; and re-executing the application under execution in response to receiving an input related to the re-execution.

Outputting the restart guide includes changing the execution screen to a predetermined resolution and outputting the changed execution screen in a state in which the application is being executed; and outputting the restart guide to at least a portion of the execution screen output at the predetermined resolution.

Changing the execution screen to a predetermined resolution and outputting the changed execution screen includes outputting a resolution change notification before outputting the execution screen at the predetermined resolution, and the resolution change notification may be output in a state in which a touch circuit of the electronic device is deactivated.

Re-executing the application under execution includes maintaining output of the execution screen changed to the predetermined resolution in response to not receiving the input related to the re-execution.

Re-executing the application under execution includes re-executing the application such that an execution screen is output through one of a first display included in the first housing structure or a second display included in the second housing structure in response to the physical state change.

Re-executing the application under execution includes outputting an unfolding guide that induces a change to the second state based on a type of the application under execution in response to detecting a change to the first state.

Re-executing the application under execution includes re-executing the application such that an execution screen corresponding to the second state is output when the change to the second state is sensed in a state in which the unfolding guide is output.

Re-executing the application under execution includes changing the execution screen to a predetermined resolution and outputting the changed screen in a state in which the application is being executed to correspond to the first state when the change to the second state is not sensed in a state in which the unfolding guide is output.

An electronic device according to an embodiment may be one of various types of electronic devices, e.g., a portable communication device (e.g., a smartphone), a computer device, a portable multimedia device, a portable medical device, a camera, a wearable device, or a home appliance. However, the electronic device are not limited to those described above.

It should be appreciated that various embodiments of the present disclosure and the terms used therein are not intended to limit the technological features set forth herein to particular embodiments and include various changes, equivalents, or replacements for a corresponding embodiment.

For example, in the above-described embodiments, respective operations may be performed sequentially, but are not necessarily performed sequentially. Accordingly, the order of respective operations may be changed, and at least two operations may be performed in parallel.

With regard to the description of the drawings, similar reference numerals may be used to refer to similar or related elements.

A singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order).

If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, e.g., "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:
1. An electronic device, comprising:
a first housing including a first face, and a second face opposite the first face;

a second housing including a third face, and a fourth face opposite the third face;

a hinge connecting the first housing and the second housing, wherein the second housing folds about the hinge to face the first housing;

a flexible display extending from the first face to the third face;

a display exposed through the second face;

a sensor circuit configured to sense a change in a physical state between the first housing and the second housing folding at the hinge; and a processor operatively connected to the flexible display, the display and the sensor circuit, wherein the processor is configured to:

while an application is being executed, detect the change in the physical state of the first housing and the second housing based on the sensor circuit, wherein the physical state includes a first state in which the first housing and the second housing are folded onto each other or a second state in which the first face of the first housing and the third face of the second housing face a same direction, determine whether the application being executed supports a resolution change when the change of the physical state is detected, in response to the application not supporting the resolution change when the change of the physical state is detected, re-execute the application, and in response to the application supporting the resolution change when the change of the physical state is detected, change a resolution of an execution screen of the application, and wherein re-executing the application comprises:

determining a type of the application being executed based on whether the application being executed supports an automatic screen rotation function, wherein the type of the application includes a first type in which the resolution of the execution screen of the application is changed based on a first predetermined resolution and a second type in which the resolution of the execution screen of the application is changed based on a second predetermined resolution, wherein the first predetermined resolution includes a resolution at which the execution screen of the application is output without a blank space on the flexible display or the display on which the execution screen of the application is to be output based on a size of the flexible display or the display and the second predetermined resolution includes a resolution at which the execution screen of the application is output having the blank space on the flexible display or the display on which the execution screen of the application is to be output based on an aspect ratio of the flexible display or the display, when the application being executed is the first type of application, re-executing the application so that the resolution of the execution screen of the application is output at the first predetermined resolution when sensing a resolution change event, and when the application being executed is the second type of application, re-executing the application so that the resolution of the execution screen of the application is output at the second predetermined resolution when sensing the resolution change event.

2. The electronic device of claim 1, wherein, in the first state, the first face of the first housing and the third face of the second housing face each other.

3. The electronic device of claim 1, wherein the processor is further configured to:

output a restart guide for guiding a user to input an input related to re-execution of the currently executed application to at least a portion of an execution screen of the currently executed application, before re-executing the currently executed application, and re-execute the currently executed application in response to receiving the input related to the re-execution.

4. The electronic device of claim 3, wherein the processor is further configured to:

change the execution screen to the first resolution or the second resolution and output the changed execution screen while the application is being executed, and output the restart guide to at least the portion of the execution screen output at the first resolution or the second resolution.

5. The electronic device of claim 4, wherein the flexible display and the display include a touch circuit configured to sense a touch input, and wherein the processor is further configured to output a resolution change notification before outputting the execution screen at the first resolution or the second resolution, wherein the resolution change notification is output while the touch circuit is deactivated.

6. The electronic device of claim 4, wherein the processor is further configured to maintain output of the execution screen changed to the first resolution or the second resolution in response to not receiving the input related to the re-execution.

7. The electronic device of claim 1, wherein the processor is further configured to output an unfolding guide that guides a user a change to the second state, based on the type of the currently executed application, in response to detecting a change to the first state.

8. The electronic device of claim 7, wherein the processor is further configured to re-execute the currently executed application such that an execution screen corresponding to the second state is output, when the change to the second state is sensed while the unfolding guide is output.

9. The electronic device of claim 7, wherein the processor is further configured to change the execution screen to the first resolution to correspond to the first state and output the changed execution screen while the application is being executed, when the change to the second state is not sensed while the unfolding guide is output.

10. A method of operating an electronic device, the method comprising:

while an application is being executed, detecting a change in a physical state between a first housing and a second housing of the electronic device, based on a sensor circuit of the electronic device, wherein the physical state includes a first state in which the first housing and the second housing are folded onto each other or a second state in which a first face of the first housing and a third face of the second housing face a same direction;

determining whether the application being executed supports a resolution change when the physical state is changed;

in response to the application not supporting the resolution change when the physical state is changed, re-executing the currently executed application; and in response to the application supporting the resolution change when the physical state is changed, changing a resolution of an execution screen of the currently executed application, wherein re-executing the currently executed application comprises:
  determining a type of the application being executed based on whether the application being executed supports an automatic screen rotation function, wherein the type of the application includes a first type in which the resolution of the execution screen of the application is changed based on a first predetermined resolution and a second type in which the resolution of the execution screen of the application is changed based on a second predetermined resolution, wherein the first predetermined resolution includes a resolution at which the execution screen of the application is output without a blank space on a flexible display or a display on which the execution screen of the application is to be output based on a size of the flexible display or the display and the second predetermined resolution includes a resolution at which the execution screen of the application is output having the blank space on the flexible display or the display on which the execution screen of the application is to be output based on an aspect ratio of the flexible display or the display,
  when the application being executed is the first type of application, re-executing the application so that the resolution of the execution screen of the application is output at the first predetermined resolution when sensing a resolution change event, and
  when the application being executed is the second type of application, re-executing the application so that the resolution of the execution screen of the application is output at the second predetermined resolution when sensing the resolution change event.

11. The method of claim 10, wherein, in the first state, the first face of the first housing and the third face of the second housing face each other.

12. The method of claim 10, wherein re-executing the currently executed application comprises:
  outputting a restart guide for guiding a user to input an input related to re-executing the currently executed application to at least a portion of an execution screen of the currently executed application, before re-executing the currently executed application; and
  re-executing the currently executed application in response to receiving the input related to the re-execution.

13. The method of claim 12, wherein outputting the restart guide comprises:
  changing the execution screen to the first resolution or the second resolution and outputting the changed execution screen while the application is currently being executed, and
  outputting the restart guide to at least a portion of the execution screen output at the first resolution or the second resolution.

14. The method of claim 13, wherein changing the execution screen to the first resolution or the second resolution and outputting the changed execution screen comprises outputting a resolution change notification, before outputting the execution screen at the first resolution or the second resolution, wherein the resolution change notification is output while a touch circuit of the electronic device is deactivated.

15. The method of claim 13, wherein re-executing the currently executed application comprises maintaining output of the execution screen changed to the first resolution or the second resolution, in response to not receiving the input related to the re-execution.

16. The method of claim 10, wherein re-executing the currently executed application comprises outputting an unfolding guide that guides a user to change the electronic device to the second state, based on the type of the currently executed application, in response to detecting a change to the first state.

17. The method of claim 16, wherein re-executing the currently executed application comprises re-executing the currently executed application such that an execution screen corresponding to the second state is output when the change to the second state is sensed while the unfolding guide is output.

18. The method of claim 16, wherein re-executing the currently executed application comprises changing the execution screen to the first resolution to correspond to the first state and outputting the changed execution screen while the currently executed application is being executed, when the change to the second state is not sensed while the unfolding guide is output.

* * * * *